(12) United States Patent
Wang et al.

(10) Patent No.: US 12,682,241 B2
(45) Date of Patent: Jul. 14, 2026

(54) COMPUTER-IMPLEMENTED METHODS AND SYSTEMS FOR COMPRESSING DEEP NEURAL NETWORK MODELS USING ALTERNATING DIRECTION METHOD OF MULTIPLIERS (ADMM)

(71) Applicant: Northeastern University, Boston, MA (US)

(72) Inventors: Yanzhi Wang, Newton Highlands, MA (US); Xue Lin, Newton Highlands, MA (US)

(73) Assignee: Northeastern University, Boston, MA (US)

( * ) Notice: Subject to any disclaimer, the term of this patent is extended or adjusted under 35 U.S.C. 154(b) by 983 days.

(21) Appl. No.: 17/128,763

(22) Filed: Dec. 21, 2020

(65) Prior Publication Data

US 2021/0192352 A1 Jun. 24, 2021

Related U.S. Application Data

(60) Provisional application No. 62/950,398, filed on Dec. 19, 2019.

(51) Int. Cl.
*G06N 3/082* (2023.01)
*G06N 3/063* (2023.01)

(52) U.S. Cl.
CPC ............. *G06N 3/082* (2013.01); *G06N 3/063* (2013.01)

(58) Field of Classification Search
CPC .. G06N 3/02; G06N 3/43; G06N 3/08; G06N 7/01; G06N 7/023; G06N 3/0464; G06N 3/0495; G06N 3/06
See application file for complete search history.

(56) References Cited

U.S. PATENT DOCUMENTS 10,366,322 B2 7/2019 David et al.
10,489,703 B2 11/2019 Yang et al.
(Continued)

FOREIGN PATENT DOCUMENTS

WO WO-2019086104 A1 5/2019

OTHER PUBLICATIONS

Ao Ren et al. "ADMM-NN: An Algorithm-Hardware Co-Design Framework of DNNs Using Alternating Direction Method of Multipliers." arXiv.org (2018): n. pag. Web. (Year: 2018).*
(Continued)

*Primary Examiner* — Daniel T Pellett
(74) *Attorney, Agent, or Firm* — Foley Hoag LLP; Dana M. Gordon; Erik A. Huestis

(57) ABSTRACT

ADMM-NN is an algorithm-hardware co-optimization framework of DNNs using Alternating Direction Method of Multipliers (ADMM). The first part of ADMM-NN is a systematic, joint framework of DNN weight pruning and quantization using ADMM. The second part is a hardware-aware optimization to facilitate hardware-level implementations. ADMM-based weight pruning and quantization accounts for (i) computation reduction and energy efficiency improvement and (ii) performance overhead due to irregular sparsity. Experimental results demonstrate that by combining weight pruning and quantization, the proposed framework can achieve 1,910× and 231× reductions in the overall model size on the LeNet-5 and AlexNet models. Favorable results are also observed on VGGNet and ResNet models. Also, without any accuracy loss, 3.6× reduction in the amount of computation can be achieved, outperforming prior work.

20 Claims, 11 Drawing Sheets

(56) References Cited

U.S. PATENT DOCUMENTS

| | | | |
|---|---|---|---|
| 10,740,659 | B2 | 8/2020 | Chen et al. |
| 10,755,136 | B2 | 8/2020 | Kadav et al. |
| 10,796,169 | B2 | 10/2020 | Kadav et al. |
| 10,832,133 | B2 | 11/2020 | Matveev et al. |
| 11,093,832 | B2 | 8/2021 | Chen et al. |
| 11,176,439 | B2 | 11/2021 | Chen et al. |
| 11,544,559 | B2 | 1/2023 | Kopinsky |
| 11,625,607 | B2 | 4/2023 | Wang et al. |
| 11,995,551 | B2 | 5/2024 | Koivisto et al. |
| 2016/0342888 | A1 | 11/2016 | Yang et al. |
| 2017/0249921 | A1 | 8/2017 | Meixner et al. |
| 2018/0096226 | A1 | 4/2018 | Aliabadi et al. |
| 2018/0336425 | A1 | 11/2018 | Kadav et al. |
| 2018/0336431 | A1 | 11/2018 | Kadav et al. |
| 2018/0336468 | A1 | 11/2018 | Kadav et al. |
| 2019/0122113 | A1 | 4/2019 | Chen et al. |
| 2019/0156201 | A1 | 5/2019 | Bichler et al. |
| 2019/0164037 | A1 | 5/2019 | Kim et al. |
| 2019/0171926 | A1 | 6/2019 | Chen et al. |
| 2019/0188526 | A1 | 6/2019 | Chen et al. |
| 2019/0188567 | A1 | 6/2019 | Yao et al. |
| 2019/0251442 | A1 | 8/2019 | Koivisto et al. |
| 2019/0311298 | A1 | 10/2019 | Kopp et al. |
| 2019/0362235 | A1 | 11/2019 | Xu et al. |
| 2020/0134461 | A1* | 4/2020 | Chai ..................... G06N 3/084 |
| 2020/0160182 | A1 | 5/2020 | Matveev et al. |
| 2020/0218978 | A1 | 7/2020 | Kopinsky |
| 2021/0097393 | A1 | 4/2021 | Wang et al. |
| 2021/0158131 | A1 | 5/2021 | Jain et al. |
| 2021/0182077 | A1 | 6/2021 | Chen et al. |
| 2021/0192352 | A1 | 6/2021 | Wang et al. |
| 2021/0256383 | A1 | 8/2021 | Wang et al. |
| 2021/0256384 | A1 | 8/2021 | Wang et al. |
| 2021/0256385 | A1 | 8/2021 | Wang et al. |
| 2022/0067527 | A1* | 3/2022 | Xu ......................... G06N 3/063 |
| 2023/0056315 | A1 | 2/2023 | Wang et al. |
| 2024/0104375 | A1 | 3/2024 | Park |

OTHER PUBLICATIONS

Leng, C., Li, H., Zhu, S., & Jin, R. (2017). Extremely low bit neural network: Squeeze the last bit out with ADMM. Ithaca: Cornell University Library, arXiv.org. Retrieved from https://dialog.proquest.com/professional/docview/2076510558?accountid=131444 (Year: 2017).*

Aghasi et al., "Net-trim: Convex pruning of deep neural networks with performance guarantee", Advances in neural information processing systems 30 (2017).

Bang et al., "14.7 a 288µw programmable deep-learning processor with 270kb on-chip weight storage using non-uniform memory hierarchy for mobile intelligence", 2017 IEEE International Solid-State Circuits Conference (ISSCC). IEEE, pp. 250-251 (2017).

Boyd et al., "Distributed optimization and statistical learning via the alternating direction method of multipliers." Foundations and Trends® in Machine learning 3.1: 1-122 (2011).

Chen et al., "Dadiannao: A machine-learning supercomputer." 2014 47th Annual IEEE/ACM International Symposium on Microarchitecture. IEEE, (2014).

Chen et al., "Diannao: A small-footprint high-throughput accelerator for ubiquitous machine-learning", ACM SIGARCH Computer Architecture News 42.1: 269-284 (2014).

Chen et al., "Eyeriss: An energy-efficient reconfigurable accelerator for deep convolutional neural networks." IEEE journal of solid-state circuits 52.1: 127-138 (2016).

Courbariaux et al., "Binaryconnect: Training deep neural networks with binary weights during propagations." Advances in neural information processing systems 28 (2015).

Dai et al., "NeST: A neural network synthesis tool based on a grow-and-prune paradigm." IEEE Transactions on Computers 68.10: 1487-1497 (2019).

Deng et al., "Imagenet: A large-scale hierarchical image database." 2009 IEEE conference on computer vision and pattern recognition. Ieee, pp. 248-255, 2009.

Denton et al., "Exploiting linear structure within convolutional networks for efficient evaluation", Advances in neural information processing systems 27: 1269-1277 (2014).

Desoli et al., "14.1 A 2.9 TOPS/W deep convolutional neural network SoC in FD-SOI 28nm for intelligent embedded systems." 2017 IEEE International Solid-State Circuits Conference (ISSCC). IEEE, 238-239, (2017).

Ding et al., "Circnn: accelerating and compressing deep neural networks using block-circulant weight matrices." Proceedings of the 50th Annual IEEE/ACM International Symposium on Microarchitecture pp. 395-408. (2017).

Dong et al., "Learning to prune deep neural networks via layer-wise optimal brain surgeon." Advances in neural information processing systems 30: 4857-4867 (2017).

Du et al., "ShiDianNao: Shifting vision processing closer to the sensor", Proceedings of the 42nd annual international symposium on computer architecture. 92-104 (2015).

Goodfellow et al., "Deep learning", MIT press, (2016).

Guo et al., "Software-hardware codesign for efficient neural network acceleration." IEEE Micro 37.2: 18-25 (2017).

Han et al., "Deep compression: Compressing deep neural networks with pruning, trained quantization and huffman coding", arXiv preprint arXiv:1510.00149 (2016).

Han et al., "Dsd: Dense-sparse-dense training for deep neural networks." arXiv preprint arXiv:1607.04381 (2016).

Han et al., "EIE: Efficient inference engine on compressed deep neural network." ACM SIGARCH Computer Architecture News 44.3: 243-254 (2016).

Han et al., "Ese: Efficient speech recognition engine with sparse lstm on fpga." Proceedings of the 2017 ACM/SIGDA International Symposium on Field-Programmable Gate Arrays. pp. 75-84 (2017).

He et al., "Channel pruning for accelerating very deep neural networks." Proceedings of the IEEE international conference on computer vision, 1398-1406 (2017).

He et al., "Deep residual learning for image recognition." Proceedings of the IEEE conference on computer vision and pattern recognition, pp. 770-778, (2016).

Hubara et al., "Binarized neural networks." Advances in neural information processing systems 29: 4107-4115 (2016).

Judd et al., "Stripes: Bit-serial deep neural network computing." 2016 49th Annual IEEE/ACM International Symposium on Microarchitecture (Micro). IEEE, 12 pages, (2016).

Kingma et al., "A method for stochastic optimization." arXiv preprint arXiv:1412.6980 (2014).

Krizhevsky et al., "Imagenet classification with deep convolutional neural networks", Advances in neural information processing systems 25: 1097-1105 (2012).

Kwon et al., "Maeri: Enabling flexible dataflow mapping over dnn accelerators via reconfigurable interconnects." ACM SIGPLAN Notices 53.2: 461-475 (2018).

Lecun et al., "Lenet-5, convolutional neural networks", URL: http://yann.lecun.com/exdb/lenet 20(5): 14 (2015).

Leng et al., "Extremely low bit neural network: Squeeze the last bit out with admm." Proceedings of the AAAI Conference on Artificial Intelligence. vol. 32. No. 1. (2018).

Lin et al., "Fixed point quantization of deep convolutional networks." International conference on machine learning. PMLR, pp. 2849-2858, (2016).

Mahajan et al., "Tabla: A unified template-based framework for accelerating statistical machine learning." 2016 IEEE International Symposium on High Performance Computer Architecture (HPCA). IEEE, pp. 14-26, (2016).

Mao et al., "Exploring the regularity of sparse structure in convolutional neural networks", arXiv preprint arXiv:1705.08922, (2017).

Matsumoto, "Intel's Deep Learning Chips Will Arrive in 2017", SDX Central, retrieved online: https://www.sdxcentral.com/articles/news/intels-deep-learning-chips-will-arrive-2017/2016/11/ (2016).

Moons et al., "14.5 envision: A 0.26-to-10tops/w subword-parallel dynamic-voltage-accuracy-frequency-scalable convolutional neural

(56) References Cited

OTHER PUBLICATIONS network processor in 28nm fdsoi", 2017 IEEE International Solid-State Circuits Conference (ISSCC). IEEE, pp. 246-247 (2017).

Osborne, "Google's Tensor Processing Unit explained: this is what the future of computing looks like", TechRadar Silicon Week, retrieved online: https://www.techradar.com/news/computing-components/processors/google-s-tensor-processing-unit-explained-this-is-what-the-future-of-computing-looks-like-1326915 (2016).

Ouyang et al., "Stochastic alternating direction method of multipliers." International conference on machine learning. PMLR, pp. 80-88 (2013).

Parashar et al., "An accelerator for compressed-sparse convolutional neural networks", In ACM SIGARCH Computer Architecture News, vol. 45, ACM, pp. 27-40 (2017).

Park et al., "Weighted-entropy-based quantization for deep neural networks." Proceedings of the IEEE Conference on Computer Vision and Pattern Recognition, pp. 7197-7205 (2017).

Qiu et al., "Going deeper with embedded FPGA platform for convolutional neural network." Proceedings of the 2016 ACM/SIGDA international symposium on field-programmable gate arrays. pp. 26-35 (2016).

Rastegari et al., "Xnor-net: Imagenet classification using binary convolutional neural networks", European conference on computer vision. Cham: Springer International Publishing pp. 525-542 (2016).

Reagen et al., "Minerva: Enabling low-power, highly-accurate deep neural network accelerators." ACM SIGARCH Computer Architecture News 44.3: 267-278 (2016).

Sharma et al., "From high-level deep neural models to FPGAs." 2016 49th Annual IEEE/ACM International Symposium on Microarchitecture (Micro). IEEE, pp. 1-13 (2016).

Sim et al., "14.6 a 1.42 tops/w deep convolutional neural network recognition processor for intelligent ioe systems." 2016 IEEE International Solid-State Circuits Conference (ISSCC). IEEE, pp. 264-265 (2016).

Simonyan et al., "A. Very deep convolutional networks for largescale image recognition", In International Conference on Learning Representations (ICLR) (2015).

Simonyan et al., "Very deep convolutional networks for large-scale image recognition", arXiv preprint arXiv:1409.1556 (2014).

Song et al., "In-situ ai: Towards autonomous and incremental deep learning for iot systems." 2018 IEEE International Symposium on High Performance Computer Architecture (HPCA). IEEE: pp. 92-103, (2018).

Suda et al., "Throughput-optimized OpenCL-based FPGA accelerator for large-scale convolutional neural networks", Proceedings of the 2016 ACM/SIGDA international symposium on field-programmable gate arrays, pp. 16-25 (2016).

Suzuki, "Dual averaging and proximal gradient descent for online alternating direction multiplier method", International Conference on Machine Learning. PMLR, pp. 392-400 (2013).

Umuroglu et al., "Finn: A framework for fast, scalable binarized neural network inference." Proceedings of the 2017 ACM/SIGDA international symposium on field-programmable gate arrays, pp. 65-74 (2017).

Venkataramani et al., "Scaledeep: A scalable compute architecture for learning and evaluating deep networks." Proceedings of the 44th Annual International Symposium on Computer Architecture. pp. 13-26 (2017).

Wen et al., "Learning structured sparsity in deep neural networks." Advances in neural information processing systems 29: pp. 2074-2082 (2016).

Whatmough et al., "14.3 A 28nm SoC with a 1.2 GHz 568nJ/prediction sparse deep-neural-network engine with> 0.1 timing error rate tolerance for IoT applications." 2017 IEEE International Solid-State Circuits Conference (ISSCC). IEEE: pp. 242-243, (2017).

Wu, Jiaxiang, et al. "Quantized convolutional neural networks for mobile devices." Proceedings of the IEEE conference on computer vision and pattern recognition, pp. 4820-4828 (2016).

Yang et al., "Designing energy-efficient convolutional neural networks using energy-aware pruning." Proceedings of the IEEE conference on computer vision and pattern recognition, pp. 6071-6079 (2017).

Ye, Shaokai, et al. "A unified framework of dnn weight pruning and weight clustering/quantization using admm." arXiv preprint arXiv:1811.01907 (2018).

Yu et al., "On compressing deep models by low rank and sparse decomposition." Proceedings of the IEEE conference on computer vision and pattern recognition. pp. 7370-7379, (2017).

Yu et al., "Scalpel: Customizing dnn pruning to the underlying hardware parallelism." ACM SIGARCH Computer Architecture News 45.2: 548-560 (2017).

Yuan et al., "Sticker: A 0.41-62.1 TOPS/W 8Bit neural network processor with multi-sparsity compatible convolution arrays and online tuning acceleration for fully connected layers." 2018 IEEE symposium on VLSI circuits. IEEE: pp. 33-34 (2018).

Zhang et al., "A systematic dnn weight pruning framework using alternating direction method of multipliers." Proceedings of the European conference on computer vision (ECCV). (2018).

Zhang et al., "Caffeine: Towards uniformed representation and acceleration for deep convolutional neural networks", Proceedings of the ACM Turing Award Celebration Conference—China 2023. (2023).

Zhang et al., "Energy-efficient CNN implementation on a deeply pipelined FPGA cluster", Proceedings of the 2016 International Symposium on Low Power Electronics and Design, pp. 326-331 (2016).

Zhang et al., "Learning to share: Simultaneous parameter tying and sparsification in deep learning", International Conference on Learning Representations. (2018).

Zhao et al., "Accelerating binarized convolutional neural networks with software-programmable FPGAs", Proceedings of the 2017 ACM/SIGDA International Symposium on Field-Programmable Gate Arrays. pp. 15-24 (2017).

Zhou et al., "Incremental network quantization: Towards lossless cnns with low-precision weights", arXiv preprint arXiv:1702.03044 (2017).

Zhu, Chenzhuo, et al. "Trained ternary quantization." In International Conference on Learning Representations, arXiv preprint arXiv:1612.01064 (2016).

Anwar et al., "Structured pruning of deep convolutional neural networks." ACM Journal on Emerging Technologies in Computing Systems (JETC) 13.3: 1-18 (2017).

Ashok et al., "N2n learning: Network to network compression via policy gradient reinforcement learning," Proceedings of International Conference on Learning Representations (ICLR), 2018 (21 pages).

Blakemore et al., "On the existence of neurones in the human visual system selectively sensitive to the orientation and size of retinal images." The Journal of Physiology 203.1 (1969): 237-260.

Boticki et al., "Quiet captures: A tool for capturing the evidence of seamless learning with mobile devices." International Conference of the Learning Sciences 1 (2010).

Chen et al., "Data-free learning of student networks," In: Proceedings of the IEEE International Conference on Computer Vision (ICCV) (2019): pp. 3514-3522.

Chen et al., "TVM: An Automated End-to-End Optimizing Compiler for Deep Learning." 13th USENIX Symposium on Operating Systems Design and Implementation (OSDI 18). 2018.

Dieleman et al., "Exploiting cyclic symmetry in convolutional neural networks," In: Proceedings of the International Conference on Machine Learning (ICML). vol. 48 (106): 1889-1898.

Freeman et al., "The design and use of steerable filters." IEEE Transactions on Pattern Analysis and Machine Intelligence 13 (1991): 891-906.

Guo et al., "Dynamic network surgery for efficient dnns." Advances in neural information processing systems 29 (2016).

Han et al., "Learning both Weights and Connections for Efficient Neural Network." Advances in Neural Information Processing Systems 28 (2015).

(56)　　　　　References Cited

OTHER PUBLICATIONS

He et al., "Amc: Automl for model compression and acceleration on mobile devices," In: Proceedings of the European Conference on Computer Vision (ECCV) (2018): 784-800.

He et al., "Asymptotic soft filter pruning for deep convolutional neural networks," IEEE Transactions on Cybernetics (2019).

He et al., "Filter pruning via geometric median for deep convolutional neural networks acceleration." Proceedings of the IEEE/CVF conference on computer vision and pattern recognition. 2019.

Hinton et al., "Deep neural networks for acoustic modeling in speech recognition: The shared views of four research groups." IEEE Signal processing magazine 29.6 (2012): 82-97.

Hinton et al., "Distilling the knowledge in a neural network," arXiv preprint arXiv:1503.02531 (2015) (9 pages).

Howard et al., "Mobilenets: Efficient convolutional neural networks for mobile vision applications." arXiv preprint arXiv:1704.04861 (2017).

Hu et al., "Network trimming: A data-driven neuron pruning approach towards efficient deep architectures." arXiv preprint arXiv:1607.03250 (2016).

Huang et al., "Data-driven sparse structure selection for deep neural networks." Proceedings of the European conference on computer vision (ECCV). 2018.

Huang et al., "Learning to prune filters in convolutional neural networks." 2018 IEEE Winter Conference on Applications of Computer Vision (WACV). IEEE, (2018).

Jochems et al., "Developing and validating a survival prediction model for nsclc patients through distributed learning across 3 countries," International Journal of Radiation Oncology* Biology* Physics 99(2) (2017): 344-352.

Jochems et al., "Distributed learning: developing a predictive model based on data from multiple hospitals without data leaving the hospital-a real life proof of concept," Radiotherapy and Oncology 121(3) (2016): 459-467.

Kingma et al., "Adam: A method for stochastic optimization." Proceedings of the International Conference on Learning Representations (2014).

Lane et al., "An early resource characterization of deep learning on wearables, smartphones and internet-of-things devices." Proceedings of the 2015 International Workshop on Internet of Things Towards Applications. 2015.

Li et al., "Layer-level knowledge distillation for deep neural network learning," Applied Sciences 9(10), (2019): 1966.

Li et al., "Pruning filters for efficient convnets." ICLR (2017).

Liu et al., "Autoslim: An automatic dnn structured pruning framework for ultra-high compression rates," arXiv preprint arXiv: 1907.03141 (2019) (10 pages).

Liu et al., "Learning efficient convolutional networks through network slimming," In: Proceedings of the IEEE International Conference on Computer Vision (ICCV) (2017): 2736-2744.

Liu et al., "Rethinking the value of network pruning," In: International Conference on Learning Representations (2018) (21 pages).

Liu et al., "Sparse convolutional neural networks." Proceedings of the IEEE conference on computer vision and pattern recognition. 2015.

Luo et al., "A filter level pruning method for deep neural network compression." In Proceedings of the IEEE international conference on computer vision, (2017): 5058-5066.

Ma et al., "An image enhancing pattern-based sparsity for real-time inference on mobile devices." Computer Vision-ECCV 2020: 16th European Conference, Glasgow, UK, Aug. 23-28, 2020, Proceedings, Part XIII 16. Springer International Publishing, (2020).

Ma et al., "Pconv: The missing but desirable sparsity in dnn weight pruning for real-time execution on mobile devices," arXiv preprint arXiv:1909.05073 (2019).

Ma et al., "The power of interpolation: Understanding the effectiveness of SGD in modern over-parametrized learning." International Conference on Machine Learning. PMLR, 2018.

Mahendran et al., "Understanding deep image representations by inverting them." Proceedings of the IEEE conference on computer vision and pattern recognition. 2015.

Mairal et al., "Convolutional Kernel Networks." Advances in Neural Information Processing Systems 27 (2014).

Min et al., "2pfpce: Two-phase filter pruning based on conditional entropy." arXiv preprint arXiv:1809.02220 (2018).

MNN, "alibaba/MNN," available at https://github.com/alibaba/MNN, first published 2020.

Nayak et al., "Zero-shot knowledge distillation in deep networks," In: Proceedings of the International Conference on International Machine Learning (ICML) (2019): 4743-4751.

Niu et al., "PatDNN: Achieving Real-Time DNN Execution on Mobile Devices with Pattern-based Weight Pruning," arXiv (Jan. 22, 2020): 16 pages.

Parashar et al., "SCNN: An accelerator for compressed-sparse; convolutional neural networks." arXiv (2017).

Philipp et al., "A sensor network abstraction for flexible public sensing systems." IEEE Eighth International Conference on Mobile Ad-Hoc and Sensor Systems. IEEE, 2011.

Ren et al., "Faster r-cnn: Towards real-time object detection with region proposal networks." Advances in neural information processing systems (2015).

Selvaraju et al., "Grad-cam: Visual explanations from deep networks via gradient-based localization." Proceedings of the IEEE international conference on computer vision. 2017.

Springenberg et al., "Striving for simplicity: The all convolutional net." arXiv preprint arXiv:1412.6806 (2015).

Sundararajan et al., "Axiomatic attribution for deep networks." International Conference on Machine Learning. PMLR, 2017.

Tai et al., "Convolutional neural networks with low-rank regularization," In: Proceedings of International Conference on Learning Representations (ICLR) (2016) (11 pages).

TensorFlow, "Model optimization," available at https://www.tensorflow.org/lite/performance/model_optimization, last updated Oct. 20, 2021.

Wang et al., "Private model compression via knowledge distillation," In: Proceedings of the AAAI Conference on Artificial Intelligence. vol. 33 (2019): 1190-1197.

Xu et al., "Deepcache: Principled cache for mobile deep vision." Proceedings of the 24th annual international conference on mobile computing and networking. 2018.

Yamins et al., "Using goal-driven deep learning models to understand sensory cortex." Nature Neuroscience 19(3) (2016): 356-365.

Yang et al., "Efficient hardware realization of convolutional neural networks using intra-kernel regular pruning", 2018 IEEE 48th International Symposium on Multiple-Valued Logic (ISMVL). IEEE,(2018).

Yao et al., "Deepsense: A unified deep learning framework for time-series mobile sensing data processing." Proceedings of the 26th International Conference on World Wide Web. 2017.

Ye et al., "Progressive weight pruning of deep neural networks using ADMM." arXiv preprint arXiv:1810.07378 (2018).

Yin et al., "Dreaming to distill: Data-free knowledge transfer via deepinversion." Proceedings of the IEEE/CVF Conference on Computer Vision and Pattern Recognition. 2020.

Yu et al., "Nisp: Pruning networks using neuron importance score propagation." Proceedings of the IEEE conference on computer vision and pattern recognition. 2018.

Zhai et al., "Doubly convolutional neural networks," In: Advances in Neural Information Processing Systems (NeurIPS) (2016): 1082-1090.

Zhang et al,. "Systematic weight pruning of dnns using alternating direction method of multipliers." arXiv preprint arXiv:1802.05747 (2018).

Zhang et al., "Adam-admm: A unified, systematic framework of structured weight pruning for dnns," arXiv:1807.11091 (2018).

Zhang, "Making convolutional networks shift-invariant again." International Conference on Machine Learning. PMLR, 2019.

Zhao et al., "Variational convolutional neural network pruning," In: Proceedings of the IEEE Conference on Computer Vision and Pattern Recognition (CVPR) (2019): 2780-2789.

(56) References Cited

OTHER PUBLICATIONS

Zhu et al., "Improving deep neural network sparsity through decorrelation regularization," In: Proceedings of International Joint Conferences on Artificial Intelligence (IJCAI) (2018): 3264-3270.
Zhuang et al., "Discrimination-aware channel pruning for deep neural networks," In: Advances in Neural Information Processing Systems (NeurIPS) (2018): 875-886.

* cited by examiner

Table 1: Weight pruning ratio and accuracy on the LeNet-5 model for MNIST dataset by our ADMM-based framework and other benchmarks.

| Benchmark | Top 1 accuracy | Number of parameters | Weight pruning ratio |
|---|---|---|---|
| Original LeNet-5 Model | 99.2% | 430.5K | 1× |
| Our Method | 99.2% | 5.06K | 85× |
| Our Method | 99.0% | 2.58K | 167× |
| Iterative pruning [24] | 99.2% | 35.8K | 12× |
| Learning to share [65] | 98.1% | 17.8K | 24.1× |
| Net-Trim [3] | 98.7% | 9.4K | 45.7× |

FIG. 6

Table 2: Weight pruning ratio and accuracy on the AlexNet model for ImageNet dataset by our ADMM-based framework and other benchmarks.

| Benchmark | Top 1 accuracy | Top 5 accuracy | Number of parameters | Weight pruning ratio |
|---|---|---|---|---|
| Original AlexNet Model | 57.2% | 80.2% | 60.9M | 1× |
| Our Method | 57.1% | 80.2% | 2.5M | 24× |
| Our Method | 56.8% | 80.1% | 2.05M | 30× |
| Iterative pruning [24] | 57.2% | 80.3% | 6.7M | 9× |
| Low rank & sparse [59] | 57.3% | 80.3% | 6.1M | 10× |
| Optimal Brain Surgeon [15] | 56.9% | 80.0% | 6.7M | 9.1× |
| SVD [12] | | 79.4% | 11.9M | 5.1x |
| NeST [10] | 57.2% | 80.3% | 3.9M | 15.7× |

FIG. 7

Table 3: Weight pruning ratio and accuracy on the VGGNet model for ImageNet dataset by our ADMM-based framework and other benchmarks.

| Benchmark | Top 1 accuracy | Top 5 accuracy | Number of parameters | Weight pruning ratio |
|---|---|---|---|---|
| Original VGGNet Model | 69.0% | 89.1% | 138M | 1× |
| Our Method | 68.7% | 88.9% | 5.3M | 26× |
| Our Method | 69.0% | 89.1% | 6.9M | 20× |
| Iterative pruning [24] | 68.6% | 89.1% | 10.3M | 13× |
| Low rank & sparse [59] | 68.8% | 89.0% | 9.2M | 15× |
| Optimal Brain Surgeon [15] | 68.0% | 89.0% | 10.4M | 13.3× |

FIG. 8

Table 4: Weight pruning ratio and accuracy on the ResNet-50 model for ImageNet dataset.

| Benchmark | Accuracy degradation | Number of parameters | Weight pruning ratio |
|---|---|---|---|
| Original ResNet-50 Model | 0.0% | 25.6M | 1× |
| Fine-grained Pruning [36] | 0.0% | 9.8M | 2.6× |
| Our Method | 0.0% | 3.6M | 7× |
| Our Method | 0.3% | 2.8M | 9.2× |
| Our Method | 0.8% | 1.47M | 17.4× |

FIG. 9

Table 5: Model size compression ratio on the LeNet-5 model for MNIST dataset by our ADMM-based framework and baseline.

| Benchmark | Accuracy degrade | Para. No. | CONV quant. | FC quant. | Total data size/ Com-press ratio | Com-press ratio | Total model size (in-cluding index)/ Com-press ratio |
|---|---|---|---|---|---|---|---|
| Original LeNet-5 | 0.0% | 430.5K | 32b | 32b | 1.7MB | | 1.7MB |
| Our Method | 0.2% | 2.57K | 3b | 2b | 0.89KB / 1,910× | | 2.73KB / 623× |
| Iterative pruning [22] | 0.1% | 35.8K | 8b | 5b | 24.2KB / 70.2× | | 52.1KB / 33× |

FIG. 10

Table 7: Layer-wise weight pruning results on the AlexNet model without accuracy loss using the ADMM framework.

| Layer | Para. No. | Para. No. af-ter prune | Para. Percentage af-ter prune |
|---|---|---|---|
| conv1 | 34.8K | 28.19K | 81% |
| conv2 | 307.2K | 61.44K | 20% |
| conv3 | 884.7K | 168.09K | 19% |
| conv4 | 663.5K | 132.7K | 20% |
| conv5 | 442.4K | 88.48K | 20% |
| fc1 | 37.7M | 1.06M | 2.8% |
| fc2 | 16.8M | 0.99M | 5.9% |
| fc3 | 4.1M | 0.38M | 9.3% |
| total | 60.9M | 2.9M | 4.76% |

FIG. 12

Table 6: Model size compression ratio on the AlexNet, VGGNet, and ResNet-50 models for ImageNet dataset by our ADMM-based framework and baselines.

| Benchmark | Accuracy degrade | Para. No. | CONV quant. | FC quant. | Total data size/ Compress ratio | Total model size (including index)/ Compress ratio |
|---|---|---|---|---|---|---|
| Original AlexNet | 0.0% | 60.9M | 32b | 32b | 243.6MB | 243.6MB |
| Our Method | 0.2% | 2.25M | 5b | 3b | 1.06MB / 231× | 2.45MB / 99× |
| Iterative pruning [22] | 0.0% | 6.7M | 8b | 8b | 5.4MB / 45× | 9.0MB / 27× |
| Binary quant. [33] | 3.0% | 60.9M | 1b | 1b | 7.3MB / 32× | 7.3MB / 32× |
| Ternary quant. [33] | 1.9% | 60.9M | 2b | 2b | 15.2MB / 16× | 15.2MB / 16× |
| Original VGGNet | 0.0% | 138M | 32b | 32b | 552MB | 552MB |
| Our Method | 0.1% | 6.9M | 5b | 3b | 3.2MB / 173× | 8.3MB / 66.5× |
| Iterative pruning [22] | 0.0% | 10.3M | 8b | 5b | 8.2MB / 67× | 17.9MB / 31× |
| Binary quant. [33] | 2.2% | 138M | 1b | 1b | 17.3MB / 32× | 17.3MB / 32× |
| Ternary quant. [33] | 1.1% | 138M | 2b | 2b | 34.5MB / 16× | 34.5MB / 16× |
| Original ResNet-50 | 0.0% | 25.6M | 32b | 32b | 102.4MB | 102.4MB |
| Our Method | 0.0% | 3.6M | 6b | 6b | 2.7MB / 38× | 4.1MB / 25.3× |
| Our Method | 2.0% | 1.47M | 4b | 4b | 0.79MB / 140× | 1.65MB / 62× |

FIG. 11

Table 8: Comparison results on the computation reduction with two metrics for the five CONV layers of AlexNet model.

| | MAC Operations | | | | | | | | | Overall prune |
|---|---|---|---|---|---|---|---|---|---|---|
| | CONV1 | CONV2 | CONV3 | CONV4 | CONV5 | CONV1-5 | FC1 | FC2 | FC3 | |
| AlexNet | 211M | 448M | 299M | 224M | 150M | 1,332M | 75M | 34M | 8M | - |
| Ours | 133M | 31M | 18M | 16M | 11M | 209M | 7M | 3M | 2M | 13x |
| Han [24] | 177M | 170M | 103M | 83M | 56M | 591M | 7M | 3M | 2M | 9x |
| Mao [36] | 175M | 116M | 67M | 52M | 35M | 445M | 5M | 2M | 1.5M | 12x |
| Wen [53] | 180M | 107M | 44M | 42M | 36M | 409M | 75M | 34M | 8M | 1.03x |
| | MAC × bits | | | | | | | | | |
| Ours | 931M | 155M | 90M | 80M | 55M | 1,311M | - | - | - | - |
| Han [24] | 1,416M | 1,360M | 840M | 664M | 448M | 4,728M | - | - | - | - |

FIG. 13

Table 9: The synthesized hardware speedup for the five CONV layers of AlexNet model

| | CONV1 | CONV2 | CONV3 | CONV4 | CONV5 | CONV1-5 speedup | CONV1-5 prune ratio | Accuracy Degra. |
|---|---|---|---|---|---|---|---|---|
| AlexNet | 1x | 1x | 1x | 1x | 1x | 1x | 1x | 0.0% |
| Ours1 | 1x | 7x | 7.5x | 7.2x | 7.1x | 3.6x | 13.1x | 0.0% |
| Ours2 | 1x | 8.6x | 9.0x | 8.8x | 8.6x | 3.9x | 35.5x | 1.5% |
| Han [24] | 0.16x | 1.4x | 1.6x | 1.5x | 1.5x | 0.64x | 2.7x | 0.0% |
| Mao [36] | 0.17x | 2.6x | 3x | 3x | 3x | 0.81x | 4.1x | 0.0% |
| Wen [53] | 0.15x | 2.9x | 4.6x | 3.8x | 2.9x | 0.77x | 5x | 0.0% |

FIG. 14

COMPUTER-IMPLEMENTED METHODS AND SYSTEMS FOR COMPRESSING DEEP NEURAL NETWORK MODELS USING ALTERNATING DIRECTION METHOD OF MULTIPLIERS (ADMM)

CROSS REFERENCE TO RELATED APPLICATION

This application claims priority from U.S. Provisional Patent Application No. 62/950,398 filed on Dec. 19, 2019 entitled ADMM-NN: An Algorithm-Hardware Compression Framework of DNNs Using Alternating Direction Methods of Multipliers, which is hereby incorporated by reference.

GOVERNMENT SUPPORT

This invention was made with government support under Grant Nos. 1739748, 1733701, and 1704662 awarded by the National Science Foundation. The government has certain rights in the invention.

BACKGROUND

The present application relates to computer-implemented methods and systems for compressing deep neural network (DNN) models using an Alternating Direction Method of Multipliers (ADMM) technique.

BRIEF SUMMARY OF THE DISCLOSURE

In accordance with one or more embodiments, a computer-implemented method is disclosed for compressing a deep neural network (DNN) model using an Alternating Direction Method of Multipliers (ADMM) technique. The method includes: (a) performing weight pruning on weights in the DNN model by solving a first subproblem and a second subproblem iteratively until convergence to reduce the number of weights in the DNN model to a set of non-zero weights; and (b) performing weight quantization on the set of non-zero weights by solving the first subproblem and the second subproblem iteratively until convergence to generate a weight pruned and quantized DNN model; wherein the first subproblem comprises performing DNN training with an additional L2 regularization term, and the second subproblem comprises dynamically updating a regularization target in each iteration.

In accordance with one or more embodiments, a computer system is disclosed comprising at least one processor; memory associated with the at least one processor; and a program supported in the memory for compressing a deep neural network (DNN) model using an Alternating Direction Method of Multipliers (ADMM) technique. The program contains a plurality of instructions which, when executed by the at least one processor, cause the at least one processor to: (a) perform weight pruning on weights in the DNN model by solving a first subproblem and a second subproblem iteratively until convergence to reduce the number of weights in the DNN model to a set of non-zero weights; and (b) perform weight quantization on the set of non-zero weights by solving the first subproblem and the second subproblem iteratively until convergence to generate a weight pruned and quantized DNN model; wherein the first subproblem comprises performing DNN training with an additional L2 regularization term, and the second subproblem comprises dynamically updating a regularization target in each iteration.

In accordance with one or more embodiments, a computer program product is disclosed for compressing a deep neural network (DNN) model using an Alternating Direction Method of Multipliers (ADMM) technique. The computer program product resides on a non-transitory computer readable medium having a plurality of instructions stored thereon which, when executed by a computer processor, cause that computer processor to: (a) perform weight pruning on weights in the DNN model by solving a first subproblem and a second subproblem iteratively until convergence to reduce the number of weights in the DNN model to a set of non-zero weights; and (b) perform weight quantization on the set of non-zero weights by solving the first subproblem and the second subproblem iteratively until convergence to generate a weight pruned and quantized DNN model; wherein the first subproblem comprises performing DNN training with an additional L2 regularization term, and the second subproblem comprises dynamically updating a regularization target in each iteration.

BRIEF DESCRIPTION OF THE DRAWINGS

FIGS. 6-14 show Tables 1-9, respectively.

DETAILED DESCRIPTION

Overview

Figure 1:
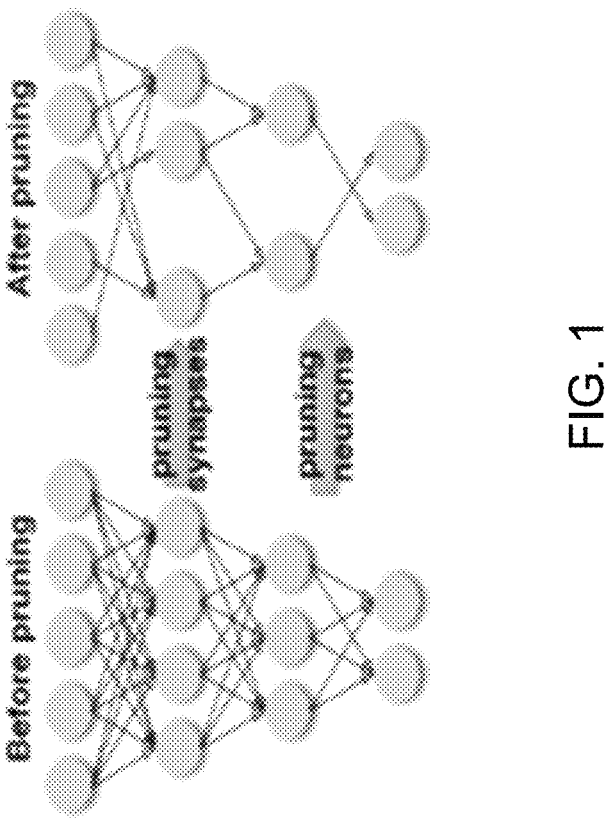
FIG. 1 is a simplified diagram illustrating weight pruning for DNNs.

To facilitate efficient embedded and hardware implementations of deep neural networks (DNNs), a number of prior works are dedicated to model compression techniques. The target is to simultaneously reduce the model storage size and accelerate the computation, with minor effect on accuracy. Two important categories of DNN model compression techniques are weight pruning and weight quantization. The former leverages the redundancy in the number of weights, whereas the latter leverages the redundancy in bit representation of weights. These two sources of redundancy can be combined, thereby leading to a higher degree of DNN model compression. However, there lacks a systematic framework of joint weight pruning and quantization of DNNs, thereby limiting the available model compression ratio. Moreover, computation reduction, energy efficiency improvement, and hardware performance overhead should also be provided in addition to simply reducing model size.

To address these limitations, we present ADMM-NN, the first algorithm-hardware co-optimization framework of DNNs using Alternating Direction Method of Multipliers (ADMM), a powerful technique to deal with non-convex optimization problems with possibly combinatorial constraints. The first part of ADMM-NN is a systematic, joint framework of DNN weight pruning and quantization using ADMM. It can be understood as a smart regularization technique with regularization target dynamically updated in each ADMM iteration, thereby resulting in higher performance in model compression than prior work. The second part is hardware-aware DNN optimizations to facilitate hardware-level implementations. We perform ADMM-based weight pruning and quantization accounting for (i) the computation reduction and energy efficiency improvement, and (ii) the hardware performance overhead due to irregular sparsity. The first requirement prioritizes the convolutional layer compression over fully-connected layers, while the latter requires a concept of the break-even pruning ratio, defined as the minimum pruning ratio of a specific layer that results in no hardware performance degradation.

Without accuracy loss, we can achieve 85× and 24× pruning on LeNet-5 and AlexNet models, respectively, significantly higher than prior work. The improvement becomes more significant when focusing on computation reductions. Combining weight pruning and quantization, we achieve 1,910× and 231× reductions in overall model size on these two benchmarks, when focusing on data storage. Highly promising results are also observed on other representative DNNs such as VGGNet and ResNet-50.

1. Introduction

The wide applications of deep neural networks (DNNs), especially for embedded and IoT systems, call for efficient implementations of at least the inference phase of DNNs in power-budgeted systems. To achieve both high performance and energy efficiency, hardware acceleration of DNNs, including both FPGA (Field Programmable Gate Arrays)-based and ASIC (Application-Specific Integrated Circuit)-based implementations, has been intensively studied both in academia and industry [1, 2, 4, 6-8, 13, 16, 20, 21, 28, 31, 35, 37, 41, 43-45, 48, 49, 51, 52, 54, 61, 62, 65]. With large model size (e.g., for ImageNet dataset [11]), hardware accelerators suffer from the frequent access to off-chip DRAM (Dynamic Random-Access Memory) due to the limited on-chip SRAM (Static Random-Access Memory). Unfortunately, off-chip DRAM accesses consume significant energy, e.g., 200× compared to on-chip SRAM [8, 21], and can thus easily dominate the whole system power consumption.

To overcome this hurdle, a number of prior works are dedicated to model compression techniques for DNNs, in order to simultaneously reduce the model size (storage requirement) and accelerate the computation, with minor effect on accuracy. Two important categories of DNN model compression techniques are weight pruning and weight quantization.

A pioneering work of weight pruning is Han et al. [24], which is an iterative, heuristic method and achieves 9× reduction in the number of weights in AlexNet (ImageNet dataset). This work has been extended for improving the weight pruning ratio and actual implementation efficiency [18, 20, 21]. Weight quantization of DNNs has also been investigated in numerous recent work [9, 27, 33, 34, 40, 42, 55, 57, 66], quantizing DNN weights to binary values, ternary values, or powers of 2, with acceptable accuracy loss. Both storage and computational requirements are reduced in this way. Multiplication operations may even be eliminated through binary or ternary weight quantizations [9, 27, 42].

The effectiveness of weight pruning lies on the redundancy in the number of weights in DNN, whereas the effectiveness of weight quantization is due to the redundancy in bit representation of weights. These two sources of redundancy can be combined, thereby leading to a higher degree of DNN model compression. Despite certain prior work investigating in this aspect using greedy, heuristic method [21, 22, 66], there lacks a systematic framework of joint weight pruning and quantization of DNNs. As a result they cannot achieve the highest possible model compression ratio by fully exploiting the degree of redundancy.

Moreover, the prior work on weight pruning and quantization mainly focuses on reducing the model size of DNNs. As a result, the major model compression is achieved in the fully-connected (FC) layers, which exhibit higher degree of redundancy. On the other hand, the convolutional (CONV) layers, which are the most computationally intensive part of DNNs, do not achieve a significant gain in compression. For example, the pioneering work [24] achieves only 2.7× weight reduction in CONV layers for AlexNet model, which still has a high improvement margin when focusing on computation reductions. Furthermore, the weight pruning technique incurs irregularity in weight storage, i.e., the irregular sparsity, and corresponding overheads in index storage and calculations, parallelism degradation, etc. These overheads have important impacts in hardware implementations. Take [24] as an example again. The 2.7× weight reduction in CONV layers often results in performance degradations as observed in multiple actual hardware implementations [20, 53, 56, 58].

To address the above limitations, this application presents ADMM-NN, the first algorithm-hardware co-design framework of DNNs using Alternating Direction Method of Multipliers (ADMM), which is a powerful technique to deal with non-convex optimization problems with possibly combinatorial constraints [5, 38, 50]. The ADMM-NN framework is general, with applications at software-level, FPGA, ASIC, or in combination with new devices and hardware advances.

The first part of ADMM-NN is a systematic, joint framework of DNN weight pruning and quantization using ADMM. Through the application of ADMM, the weight pruning and quantization problems are decomposed into two subproblems: The first is minimizing the loss function of the original DNN with an additional L2 regularization term, and can be solved using standard stochastic gradient descent like ADAM [29]. The second one can be optimally and analytically solved [5]. The ADMM framework can be understood as a smart regularization technique with regularization target dynamically updated in each ADMM iteration, thereby resulting in high performance in model compression.

The second part of ADMM-NN is hardware-aware optimization of DNNs to facilitate efficient hardware implementations. More specifically, we perform ADMM-based weight pruning and quantization accounting for (i) the computation reduction and energy efficiency improvement, and (ii) the hardware performance overhead due to irregular sparsity. We mainly focus on the model compression on CONV layers, but the FC layers need to be compressed accordingly in order not to cause overfitting (and accuracy degradation). We adopt a concept of the break-even pruning ratio, defined as the minimum weight pruning ratio of a specific DNN layer that will not result in hardware performance (speed) degradation. These values are hardware platform-specific. Based on the calculation of such ratios through hardware synthesis (accounting for the hardware performance overheads), we develop efficient DNN model compression algorithm for computation reduction and efficient hardware implementations.

The contributions of this work include: (i) ADMM-based weight pruning, ADMM-based weight quantization solutions of DNNs; (ii) a systematic, joint framework for DNN model compression; and (iii) hardware-aware DNN model compression for computation reduction and efficiency improvement.

Experimental results demonstrate the effectiveness of the proposed ADMM-NN framework. For instance, without any accuracy loss, we can achieve 85× and 24× weight pruning on LeNet-5 and AlexNet models, respectively, which is significantly higher than the prior iterative pruning (12× and 9×, respectively). By combining weight pruning and quantization, we can achieve 1,910× and 231× reductions in overall model size on these two benchmarks, when focusing on data storage. Good results are also observed on other representative DNNs such as VGGNet and ResNet-50. The computation reduction is even more significant compared with prior work. Without any accuracy loss, we can achieve 3.6× reduction in the amount of computation compared with the prior work [22, 24].

2. Background

2.1 Related Work on Weight Pruning and Quantization

Weight pruning methods leverage the inherent redundancy in the number of weights in DNNs, thereby achieving effective model compression with negligible accuracy loss, as illustrated in FIG. 1. A pioneering work of weight pruning is [24]. It uses a heuristic, iterative method to prune the weights with small magnitudes and retrain the DNN. It achieves 9× weight reduction on AlexNet for ImageNet dataset, without accuracy degradation. However, this original work achieves relatively low compression ratio (2.7× for AlexNet) on the CONV layers, which are the key computational part in state-of-the-art DNNs [25, 47]. Besides, indices are needed, at least one per weight, to index the relative location of the next weight. As a result, it suffers from low performance improvement (sometimes even degradation) in actual hardware implementations [53, 56, 58], when the overhead of irregular sparsity is accounted for.

This work has been extended in two directions. The first is improving the weight reduction ratio by using more sophisticated heuristics, e.g., incorporating both weight pruning and growing [19], using L1 regularization method [53], or genetic algorithm [10]. As an example, the recent work NeST [10] achieves 15.7× weight reduction on AlexNet with zero accuracy loss, at the cost of significant training overhead. The second is enhancing the actual implementation efficiency. This goal is achieved by either deriving an effective tradeoff between accuracy and compression ratio, e.g., the energy-aware pruning [56], or incorporating regularity and structures into the weight pruning framework, e.g., the channel pruning [26] and structured sparsity learning [53] approaches.

Weight quantization methods leverage the inherent redundancy in the number of bits for weight representation. Many related works [9, 27, 33, 34, 40, 42, 55, and 66] present weight quantization techniques to binary values, ternary values, or powers of 2 to facilitate hardware implementations, with acceptable accuracy loss. The state-of-the-art technique adopts an iterative quantization and retraining framework, with randomness incorporated in quantization [9]. It achieves less than 3% accuracy loss on AlexNet for binary weight quantization [33]. It is also worth noticing that a similar technique, weight clustering, groups weights into clusters with arbitrary values. This is different from equal-interval values as in quantization. As a result weight clustering is not as hardware-friendly as quantization [22, 67].

Pros and cons of the two methods: Weight quantization has clear advantage: it is hardware-friendly. The computation requirement is reduced in proportion to weight representation, and multiplication operations can be eliminated using binary/ternary quantizations. On the other hand, weight pruning incurs inevitable implementation overhead due to the irregular sparsity and indexing [14, 22, 53, 56, and 58].

The major advantage of weight pruning is the higher potential gain in model compression. The reasons are two-fold. First, there is often higher degree of redundancy in the number of weights than bit representation. In fact, reducing each bit in weight presentation doubles the imprecision, which is not the case in pruning. Second, weight pruning performs regularization that strengthens the salient weights and prunes the unimportant ones. It can even increase the accuracy with a moderate pruning ratio [23, 53]. As a result it provides a higher margin of weight reduction. This effect does not exist in weight quantization/clustering.

Combination: Because they leverage different sources of redundancy, weight pruning and quantization can be effectively combined. However, there lacks a systematic investigation in this direction. The extended work [22] by Han et al. uses a combination of weight pruning and clustering (not quantization) techniques, achieving 27× model compression on AlexNet. This compression ratio has been updated by the recent work [66] to 53× on AlexNet (but without any specification about compressed model).

2.2 Basics of ADMM

ADMM has been demonstrated [38, 50] as a powerful tool for solving non-convex optimization problems, potentially with combinatorial constraints. Consider a non-convex optimization problem that is difficult to solve directly. The ADMM method decomposes it into two subproblems that can be solved separately and efficiently. For example, the optimization problem $$\min_{x} f(x) + g(x) \tag{1}$$

lends itself to the application of ADMM if f(x) is differentiable and g(x) has some structure that can be exploited. Examples of g(x) include the $L_1$-norm or the indicator function of a constraint set. The problem is first rewritten as $$\min_{x,z} f(x) + g(z), \tag{2}$$

subject to $x = z$.

Next, by using augmented Lagrangian [5], the above problem is decomposed into two subproblems on x and z. The first is $\min_x f(x)+q_1(x)$, where $q_1(x)$ is a quadratic function. As $q_1(x)$ is convex, the complexity of solving subproblem 1 (e.g., via stochastic gradient descent) is the same as minimizing f(x). Subproblem 2 is $\min_z g(z)+q_2(z)$, where $q_2(z)$ is a quadratic function. When function g has some special structure, exploiting the properties of g allows this problem to be solved analytically and optimally. In this way we can get rid of the combinatorial constraints and solve the problem that is difficult to solve directly.

3. ADMM Framework for Joint Weight Pruning and Quantization

In this section, we present the novel framework of ADMM-based DNN weight pruning and quantization, as well as the joint model compression problem.

3.1 Problem Formulation

Consider a DNN with N layers, which can be convolutional (CONV) and fully-connected (FC) layers. The collection of weights in the i-th layer is $W_i$; the collection of bias in the i-th layer is denoted by $b_i$. The loss function associated with the DNN is denoted by $$f(\{W_i\}_{i=1}^N, \{b_i\}_{i=1}^N).$$

The problem of weight pruning and quantization is an optimization problem [57, 64]:

$$\underset{\{W_i\},\{b_i\}}{\text{minimize}}\ f(\{W_i\}_{i=1}^N,\ \{b_i\}_{i=1}^N), \tag{3}$$

$$\text{subject to } W_i \in S_i,\quad i = 1, \dots, N.$$

Thanks to the flexibility in the definition of the constraint set $S_i$, the above formulation is applicable to the individual problems of weight pruning and weight quantization, as well as the joint problem. For the weight pruning problem, the constraint set Si={the number of nonzero weights is less than or equal to $\alpha_i$}, where $\alpha_i$ is the desired number of weights after pruning in layer i[1]. For the weight quantization problem, the set $S_i$={the weights in layer i are mapped to the quantization values} $\{Q_1, Q_2, \dots, Q_M\}\}$, where M is the number of quantization values/levels. For quantization, these Q values are fixed, and the interval between two nearest quantization values is the same, in order to facilitate hardware implementations.

For the joint problem, the above two constraints need to be satisfied simultaneously. In other words, the number of nonzero weights should be less than or equal to a, in each layer, while the remaining nonzero weights should be quantized.

3.2 ADMM-based Solution Framework

The above problem is non-convex with combinatorial constraints, and cannot be solved using stochastic gradient descent methods (e.g., ADAM [29]) as in original DNN training. But it can be efficiently solved using the ADMM framework (combinatorial constraints can be gotten rid of.) To apply ADMM, we define indicator functions $$g_i(W_i) = \begin{cases} 0 & \text{if } W_i \in S_i, \\ +\infty & \text{otherwise} \end{cases},$$

for i=1, . . . , N. We then incorporate auxiliary variables $Z_i$ and rewrite problem (3) as $$\underset{\{W_i\},\{b_i\}}{\text{minimize}}\ f(\{W_i\}_{i=1}^N,\ \{b_i\}_{i=1}^N) + \sum_{i=1}^N g_i(Z_i), \tag{4}$$

subject to $W_i=Z_i$, i=1, . . . , N.

Through application of the augmented Lagrangian [5], problem (4) is decomposed into two subproblems by ADMM. We solve the subproblems iteratively until convergence. The first subproblem is $$\underset{\{W_i\},\{b_i\}}{\text{minimize}}\ f(\{W_i\}_{i=1}^N,\ \{b_i\}_{i=1}^N) + \sum_{i=1}^N \frac{\rho_i}{2}\|W_i - Z_i^k + U_i^k\|_F^2, \tag{5}$$

where $U_i^k$ is the dual variable updated in each iteration, $U_i^k:U_i^{k-1}+W_i^k-Z_i^k$. In the objective function of (5), the first term is the differentiable loss function of DNN, and the second quadratic term is differentiable and convex. The combinatorial constraints are effectively gotten rid of. This problem can be solved by stochastic gradient descent (e.g., ADAM) and the complexity is the same as training the original DNN.

The second subproblem is $$\underset{\{Z_i\}}{\text{minimize}}\ \sum_{i=1}^N g_i(Z_i) + \sum_{i=1}^N \frac{\rho_i}{2}\|W_i^{k+1} - Z_i + U_i^k\|_F^2. \tag{6}$$

As $g_i(\cdot)$ is the indicator function of $S_i$, the analytical solution of subproblem (6) is $$Z_i^{k+1} = \prod_{S_i} \left(W_i^{k+1} + U_i^k\right),$$

where $\Pi S_i(\cdot)$ is Euclidean projection of $W_i^{k+1}+U_i^k$ onto the set $S_i$. The details of the solution to this subproblem is problem-specific. For weight pruning and quantization problems, the optimal, analytical solutions of this problem can be found. The derived $Z_i^{k+1}$ will be fed into the first subproblem in the next iteration.

The intuition of ADMM is as follows. In the context of DNNs, the ADMM-based framework can be understood as a smart regularization technique. Subproblem 1 (Eqn. (5)) performs DNN training with an additional L2 regularization term, and the regularization target $Z_i^k-U_i^k$ is dynamically updated in each iteration through solving subproblem 2. This dynamic updating process is the key reason why ADMM-based framework outperforms conventional regularization method in DNN weight pruning and quantization.

3.3 Solution to Weight Pruning and Quantization, and the Joint Problem

Both weight pruning and quantization problems can be effectively solved using the ADMM framework. For the weight pruning problem, the Euclidean projection Eqn. (7) is to keep $\alpha_i$ elements in $W_i^{k+1}+U_i^k$ with largest magnitude and set the rest to be zero [38, 50]. This is proved to be the optimal and analytical solution to subproblem 2 (Eqn. (6)) in weight pruning.

For the weight quantization problem, the Euclidean projection Eqn. (7) is to set every element in $W_i^{k+1}+U_i^k$ to be the quantization value closest to that element. This is also the optimal and analytical solution to subproblem 2 in quantization. The determination of quantization values will be discussed in details in the next subsection.

For both weight pruning and quantization problems, the first subproblem has the same form when $Z_i^k$ is determined through Euclidean projection. As a result they can be solved in the same way by stochastic gradient descent (e.g., the ADAM algorithm).

Figure 2:
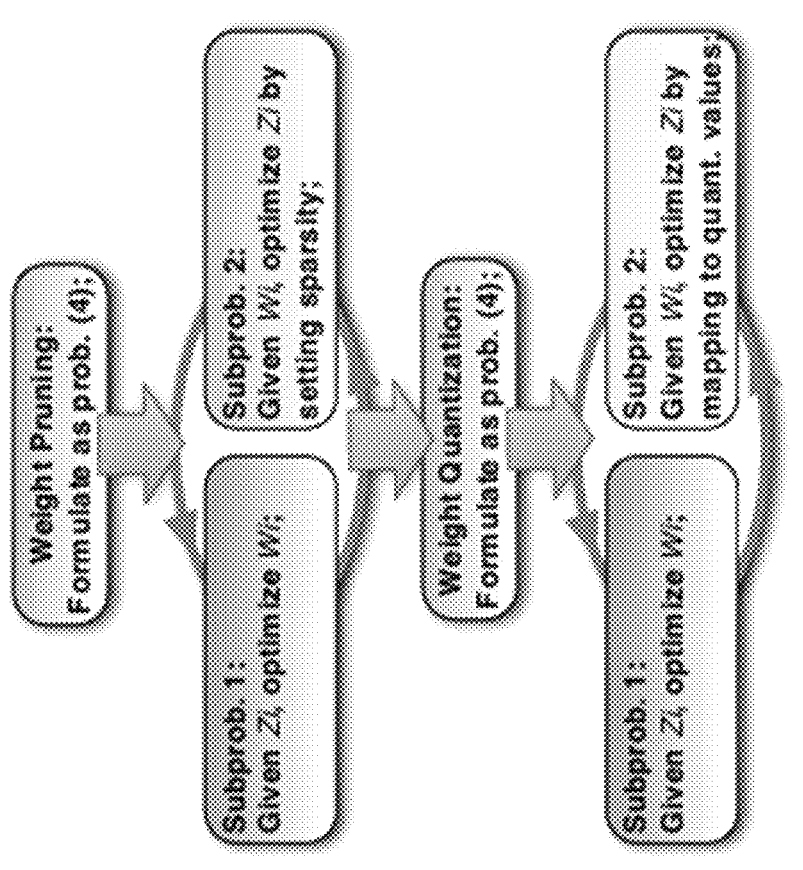
FIG. 2 is a flow chart illustrating an algorithm for joint weight pruning and quantization using ADMM in accordance with one or more embodiments.

For the joint problem of weight pruning and quantization, there is an additional degree of flexibility when performing Euclidean projection, i.e., a specific weight can be either projected to zero or to a closest quantization value. This flexibility will add difficulty in optimization. To overcome this hurdle, we perform weight pruning and quantization in two steps. We choose to perform weight pruning first, and then implement weight quantization on the remaining, non-zero weights. The reason for this order is the following observation: There typically exists higher degree of redundancy in the number of weights than the bit representation of weights. As a result, we can typically achieve higher model compression degree using weight pruning, without any accuracy loss, compared with quantization. The observation is validated by prior work [18, 20, 21] (although many are on clustering instead of quantization), and in our own investigations. FIG. 2 summaries the key steps of solving the joint weight pruning and quantization problem based on ADMM framework.

Thanks to the fast theoretical convergence rate of ADMM, the proposed algorithms have fast convergence. To achieve a good enough compression ratio for AlexNet, we need 72 hours for weight pruning and 24 hours for quantization. This is much faster than [24] that requires 173 hours for weight pruning only.

3.4 Details in Parameter Determination 3.4.1 Determination of Weight Numbers in Pruning:

The most important parameters in the ADMM-based weight pruning step are the a, values for each layer i. To determine these values, we start from the values derived from the prior weight pruning work [22, 24]. When targeting high compression ratio, we reduce the $a_i$ values proportionally for each layer. When targeting computation reductions, we deduct the $a_i$ values for convolutional (CONV) layers, because CONV layers account for the major computation compared with FC layers. Our experimental results demonstrate about 2-3× further compression under the same accuracy, compared with the prior work [15, 22, 24, 59].

The additional parameters in ADMM-based weight pruning, i.e., the penalty parameters $\rho_i$, are set to be $\rho_1 = \ldots = \rho_N = 3 \times 10-3$. This choice is basically very close for different DNN models, such as AlexNet [30] and VGG-16 [46]. The pruning results are not sensitive to the penalty parameters of the optimal choice, unless these parameters are increased or decreased by orders of magnitude.

3.4.2 Determination of Quantization Values:

After weight pruning is performed, the next step is weight quantization on the remaining, non-zero weights. We use n bits for equal-distance quantization to facilitate hardware implementations, which means there are a total of $M=2^n$ quantization levels. More specifically, for each layer i, we quantize the weights into a set of quantization values $$\left\{ -\frac{M}{2} q_i, \ldots, -2q_i, -q_i, q_i, 2q_i, \ldots, \frac{M}{2} q_i \right\}.$$

Note that 0 is not a quantization value because it means that the corresponding weight has been pruned.

The interval $q_i$ is the distance between two adjacent quantization values, and may be different for different layers. This is compatible with hardware implementations. This is because (i) the qi value of each layer is stored along with the quantized weights of that specific layer, and (ii) a scaling computation will be performed using the $q_i$ value on the outputs of layer i. Such scaling computation is needed in equal-distance weight quantization [34, 55].

Figures 3A, 3B, 3C:
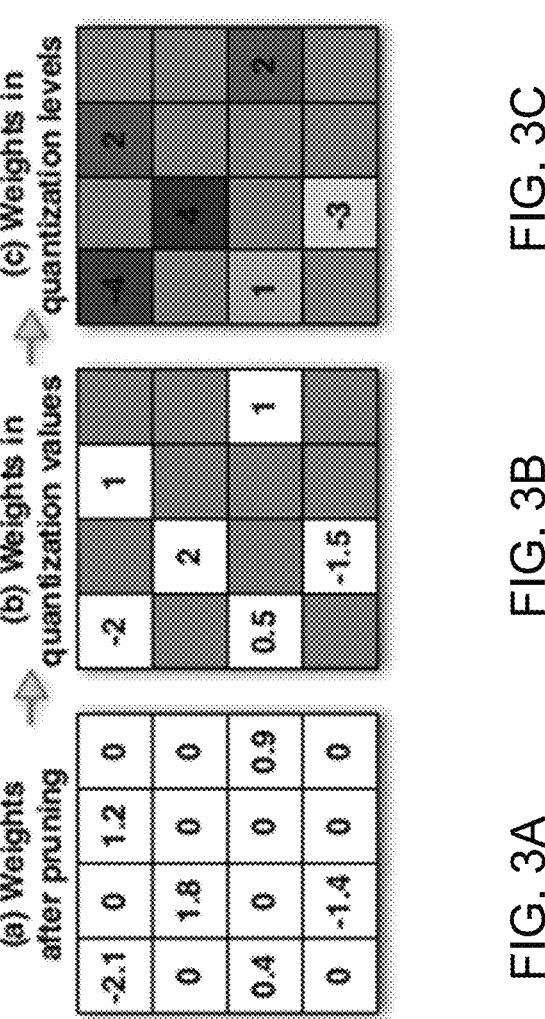
FIGS. 3A-3C are simplified diagrams illustrating weight quantization (where the interval value $q_i$=0.5) in accordance with one or more embodiments.

FIGS. 3A-3C show an example of weight quantization procedure. Suppose we have a 4×4 weight matrix. FIG. 3A shows the weights to be quantized, obtained after pruning.

Based on the weight values, $q_i=0.5$, n=3, and M=2n are determined. FIG. 3B shows the weight values after quantization, and FIG. 3C shows the weights represented in quantization levels. Note that quantization levels encoded in binary bits are the operands to be stored and operated in the hardware. For the case of FIGS. 3A-3C, quantization levels {−4, −3, −2, −1, 1, 2, 3, 4} are encoded using 3 binary bits, since 0 denoting pruned weights is not needed. Weights in quantization levels (FIG. 3C) times $q_i=0.5$ resulting in quantized weights (FIG. 3B).

The interval $q_i$ and number of quantization levels M(n) are predefined, and should be determined in an effective manner. For M(n) values, we start from the results of some prior work like [24], and reduce n accordingly. For example, [22] uses on average around 5 bits for quantization (essentially clustering) in AlexNet, whereas our results show that 3-4 bits on average are sufficient in quantization without incurring any accuracy loss, on representative benchmark DNNs.

To determine $q_i$, let $w^j_i$ denote the j-th weight in layer i, and $f(w^j_i)$ denote the quantization function to the closest quantization value. Then the total square error in a single quantization step is given by $$\sum_j |w^j_i - f(w^j_i)|^2.$$

We derive $q_i$ using binary search method, such that the above total square error is minimized. In this way we determine both $q_i$ and M (n) for weight quantization.

4 Results and Discussions on DNN Model Compressions

In this section, we summarize the software-level results on DNN model compression using the proposed ADMM framework of weight pruning and quantization. We perform testing on a set of representative DNN benchmarks, LeNet-5 [32] for MNIST dataset, AlexNet [30] (BVLC model and CaffeNet model, both open-source), VGGNet [46], and ResNet-50 [25] for ImageNet dataset. We initialize ADMM using pretrained DNN models and then perform weight pruning/quantization. We focus on the model compression of the overall DNN model (i.e., the total number of weights and total number of bits for weight representations). We perform comparison with representative works on DNN weight pruning and quantization (clustering), and demonstrate the significant improvement using the proposed ADMM framework. Algorithm implementations are on the open-source Caffe tool with code/model release, and DNN training and compression are performed using NVIDIA Tesla P100 and GeForce GTX 1080Ti GPUs.

4.1 Results on ADMM-Based Weight Pruning

Table 1 (FIG. 6) shows the weight pruning results on the LeNet-5 model, in comparison with various benchmarks. LeNet-5 contains two CONV layers, two pooling layers, and two FC layers, and can achieve 99.2% test accuracy on the MNIST dataset. Our ADMM-based weight pruning framework does not incur accuracy loss and can achieve a much higher weight pruning ratio on these networks compared with the prior iterative pruning heuristic [24], which reduces the number of weights by 12× on LeNet-5. In fact, our pruning method reduces the number of weights by 85×, which is 7.1× improvement compared with [24]. The maximum weight reduction is 167× for LeNet-5 when the accuracy is as high as 99.0%.

Similar results can be achieved on the BVLC AlexNet model and VGGNet model on the ImageNet ILSVRC-2012 dataset. The original BVLC AlexNet model can achieve a top-1 accuracy 57.2% and a top-5 accuracy 80.2% on the validation set, containing 5 CONV (and pooling) layers and 3 FC layers with a total of 60.9M parameters. The original VGGNet model achieves a top-1 accuracy 69.0% and top-5 accuracy 89.1% on ImageNet dataset, with a total of 138M parameters. Table 2 (FIG. 7) shows the weight pruning comparison results on AlexNet while Table 3 (FIG. 8) shows the comparison results on VGGNet. The proposed ADMM method can achieve 24× weight reduction in AlexNet and 26× weight reduction in VGGNet, without any accuracy loss. These results are at least twice as the state-of-the-art, and clearly demonstrate the advantage of the proposed weight pruning method using ADMM.

For the results on ResNet-50 model on ImageNet as shown in Table 4 (FIG. 9), we achieve 7× weigh pruning without accuracy degradation, and 17.4× with minor accuracy degradation less than 1%.

The reasons for the advantage are two folds: First, the ADMM-based framework is a systematic weight pruning framework based on optimization theory, which takes an overall consideration of the whole DNN instead of making local, greedy pruning choices. In fact, with a moderate pruning ratio of 3×, the top-1 accuracy of AlexNet can be even increased to 59.1%, almost 2% increase. Second, as discussed before, the ADMM-based framework can be perceived as a smart, dynamic DNN regularization technique, in which the regularization target is analytically adjusted in each iteration. This is very different from the prior regularization techniques [17, 53] in which the regularization target is predetermined and fixed.

4.2 Results on ADMM-Based Joint Weight Pruning and Quantization for DNNs

In this section we perform comparisons on the joint weight pruning and quantization results. Table 5 (FIG. 10) presents the results on LeNet-5, while Table 6 (FIG. 11) presents the results on AlexNet, VGGNet, and ResNet-50. We can simultaneously achieve 167× pruning ratio on LeNet-5, with an average of 2.78-bit for weight representation (fewer-bit representation for FC layers and more-bit for CONV layers). When accounting for the weight data representation only, the overall compression ratio is 1,910× on LeNet-5 when comparing with 32-bit floating point representations. For weight data representation, only 0.89 KB is needed for the whole LeNet-5 model with 99% accuracy. This is clearly approaching the theoretical limit considering the input size of 784 pixels (less than 1K) for each MNIST data sample.

For AlexNet and VGGNet models, we can use an average of 3.7-bit for weight representation. When accounting for the weight data only, the overall compression ratios are close to 200×. These results are significantly higher than the prior work such as [22, 24], even when [22] focuses on weight clustering instead of quantization. (Weight clustering is less hardware-friendly, but should perform better than weight quantization in model compression. The reason is because weight quantization can be perceived as a special case of clustering.) For example, [24] achieves 9× weight pruning on AlexNet and uses an average of higher than 5 bits (8 bits for CONV layers and 5 bits for FC layers) for weight representation. These results are also higher than performing weight quantization/clustering alone because the maximum possible gain when performing quantization/clustering alone is 32 (we need to use 1 bit per weight anyway) compared with floating-point representations, let alone accuracy degradations. These results clearly demonstrate the effectiveness of the proposed ADMM framework on joint weight pruning and quantization for DNNs. Similar results are also observed on the joint weight pruning and quantization results on ResNet-50 model.

However, the actual storage reduction cannot reach such a high gain. For DNNs, the model size is defined as the total number of bits (or Bytes) to actually store a DNN model. The reason for this gap is the indices, which are needed (at least) one per weight with weight pruning in order to locate the ID of the next weight [24]. For instance, we need more bits for each index for the pruned AlexNet than [24] because we achieve a higher pruning ratio. The storage requirement for indices will be even higher compared with the actual data, because the ADMM framework is very powerful in weight quantization. This will add certain overhead for the overall model storage, as also shown in the tables.

Finally, we point out that it may be somewhat biased when only considering the model size reduction of DNNs. We list in Table 7 (FIG. 12) the layer-wise weight pruning results for AlexNet, using the proposed ADMM framework. We can observe that the major weight pruning and quantization are achieved in the FC layers, compared with CONV layers. The reasons are that the FC layers account for more than 90% of weights and possess a higher degree of redundancy, thereby enabling higher degree of weight pruning/quantization. This is the same as the prior work such as [24], which achieves 9× overall weight reduction while only 2.7× reduction on CONV layers. It uses 5-bit for weight representation of FC layers and 8 bits for CONV layers. On the other hand, we emphasize that the CONV layers account for the major computation in state-of-the-art DNNs, e.g., 95% to 98% in AlexNet and VGGNet [30, 46], and even more for ResNet [25]. For computation reduction and energy efficiency improvement, it is more desirable to focus on CONV layers for weight pruning and quantization. This aspect will be addressed in the next section.

4.3 Making AlexNet and VGGNet On-Chip

An important indication of the proposed ADMM framework is that the weights of most of the largescale DNNs can be stored on-chip for FPGA and ASIC designs. Let us consider AlexNet and VGGNet as examples. For AlexNet, the number of weights before pruning is 60.9M, corresponding to 244 MB storage (model size) when 32-bit floating point number is utilized for weight representation. Using the proposed ADMM weight pruning and quantization framework, the total storage (model size) of AlexNet is reduced to 2.45 MB (using 2.25M weights) when the indices are accounted for. This model size is easily accommodated by the medium-to-high end FPGAs, such as Xilinx Kintex-7 series, and ASIC designs. This is achieved without any accuracy loss.

On the other hand, VGGNet, as one of the largest DNNs that is widely utilized, has a total number of 138M weights, corresponding to 552 MB storage when 32-bit floating point number is used for weight representation. Using the proposed ADMM framework, the total model size of VGGNet is reduced to 8.3 MB (using 6.9M weights) when the indices are accounted for. This model size can still be accommodated by a single high-end FPGA such as Altera (Intel) DE-5 and Xilinx Virtex-7. The effect that large-scale AlexNet and VGGNet models can be stored using on-chip memory of single FPGA/ASIC will significantly facilitate the wide application of large-scale DNNs, in embedded, mobile, and IoT systems. On the other hand, when accounting for the computation reductions rather than mere storage (model size) reduction, it is more desirable to focus mainly on the model compression on CONV layers rather than the whole DNN model. Also it is desirable to focus more on CONV layers since a smaller on-chip memory can be both cost and speed-beneficial, which is critical especially for custom ASIC.

5. Hardware-Aware Computation Reduction

Motivation: As discussed in the previous section and illustrated in Table 7 (FIG. 12), the current gains in weight pruning and quantization are mainly attributed to the redundancy in FC layers. This optimization target is not the most desirable when accounting for the computation reduction and energy efficiency improvement. The reason is that CONV layers account for the major computation in state-of-the-art DNNs, even reaching 98% to 99% for the recent VGGNet and ResNet models [30, 46]. In actual ASIC design and implementations, it will be desirable to allocate on-chip memory for the compressed CONV layers while using off-chip memory for the less computationally intensive FC layers. In this way the on-chip memory can be reduced, the memory speed can be faster, while the major computation part of DNN (CONV layers) can be accelerated. Therefore it is suggested to perform weight pruning and quantization focusing on the CONV layers.

The prior weight pruning work [22, 24] cannot achieve a satisfactory weight pruning ratio on CONV layers while guaranteeing the overall accuracy. For example, [24] achieves only 2.7× weight pruning on the CONV layers of AlexNet. In fact, the highest gain in reference work on CONV layer pruning is 5.0× using L1 regularization [53], and does not perform any pruning on FC layers. Sometimes, a low weight pruning ratio will result in hardware performance degradation, as reported in a number of actual hardware implementations [53, 56, 58]. The key reason is the irregularity in weight storage, the associated overhead in calculating weight indices, and the degradation in parallelism. This overhead is encountered in the PE (processing element) design when sparsity (weight pruning) is utilized. This performance overhead should be accurately characterized and effectively accounted for in the hardware-aware weight pruning framework.

5.1 Algorithm-Hardware Co-Optimization

In a nutshell, we need to (i) focus mainly on CONV layers in weight pruning/quantization, and (ii) effectively account for the hardware performance overhead for irregular weight storage, in order to facilitate efficient hardware implementations. We start from an observation about coordinating weight pruning in CONV and FC layers for maintaining overall accuracy.

Observation on Coordinating Weight Pruning: Even when we focus on CONV layer weight pruning, we still need to prune the FC layers moderately (e.g., about 3-4×) for maintaining the overall accuracy. Otherwise it will incur certain accuracy degradation.

Although lack of formal proof, the observation can be intuitively understood in the following way: The original DNN models, such as LeNet-5, AlexNet, or VGGNet, are heavily optimized and the structures of CONV and FC layers match each other. Pruning the CONV layers alone will incur mismatch in structure and number of weights with the FC layers, thereby incurring overfitting and accuracy degradation. This is partially the reason why prior work like L1 regularization [53] does not have satisfactory performance even when only focusing on CONV layers. This observation brings 0.5% to 1% accuracy improvement, along with additional benefit of simultaneous computation reduction and model size reduction, and will be exploited in our framework.

Break-even Weight Pruning Ratio: Next, we define the concept of break-even weight pruning ratio, as the minimum weight pruning ratio of a specific (CONV or FC) layer that will not result in hardware performance degradation. Below this break-even ratio, performance degradation will be incurred, as actually observed in [53, 56, 58]. This break-even pruning ratio is greater than 1 because of the hardware performance overhead from irregular sparsity. It is hardware platform-specific. It is important to the hardware-aware weight pruning framework. For example, if the actual weight pruning ratio for a specific layer is lower than the break-even ratio, there is no need to perform weight pruning on this layer. In this case, we will restore the original structure of this layer and this will leave more margin for weight pruning in the other layers with more benefits.

Break-even Pruning Ratio Calculation: To calculate the break-even pruning ratios, we fairly compare (i) the inference delay of the hardware implementation of the original DNN layer without pruning with (ii) the delays of hardware implementations under various pruning ratios. The comparison is under the same hardware area/resource. We control two variables: (i) a predefined, limited hardware area, and (ii) the goal to complete all computations in one DNN layer, which will be different under various pruning ratios. Specifically, we set the hardware implementation of the original layer as baseline, thus its hardware area becomes a hard limit. Any hardware implementations supporting weight pruning cannot exceed this limit.

Hardware resources of the baseline comprise two parts: one is process elements (PE) responsible for GEMM (general matrix multiplication) and activation calculations, and the other is SRAM that stores features, weights, and biases. Although the implementations under various pruning ratios are also composed of PEs and SRAMs, the differences lie in three aspects: (i) the area occupied by SRAM is different. This is because with different pruning ratios, the numbers of indices are different, and the numbers of weights are different as well; (ii) the remaining resources for PE implementation are thus different. It is possible to have more resources for PE implementation or less; (iii) the maximum frequency of each type of implementations is different, due to the difference in the size of PEs and index decoding components.

Figure 4:
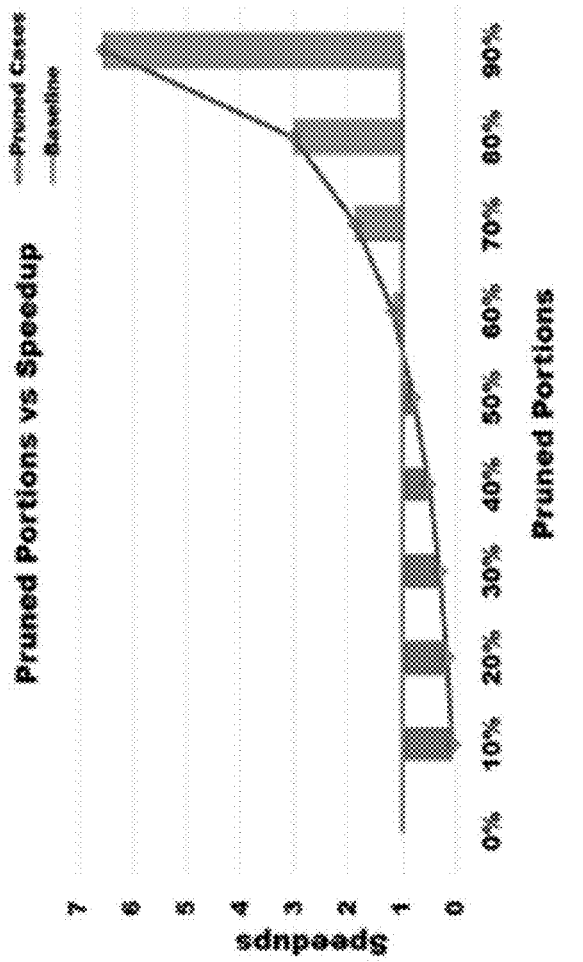
FIG. 4 is a graph illustrating a speedup comparison between pruned cases and baseline on a DNN layer to derive the break-even weight pruning ratio in accordance with one or more embodiments.

Being aware of these differences, we implement the baseline and 9 pruning cases with pruning portions ranging from 10% to 90%. We adopt the state-of-the-art hardware architecture to support weight pruning [39, 60]. The hardware implementations are synthesized in SMIC 40 nm CMOS process using Synopsys Design Compiler. Then we measure the delay values of those implementations. The speedup values of the pruning cases over the baseline are depicted in FIG. 4. In the figure, the speedup of the baseline itself is 1, and the results suggest that the pruning portion should be higher than about 55%, in order to make sure that the benefits of pruning outperforms the overhead of indices. This corresponds to a break-even weight pruning ratio of 2.22.

Figure 5:
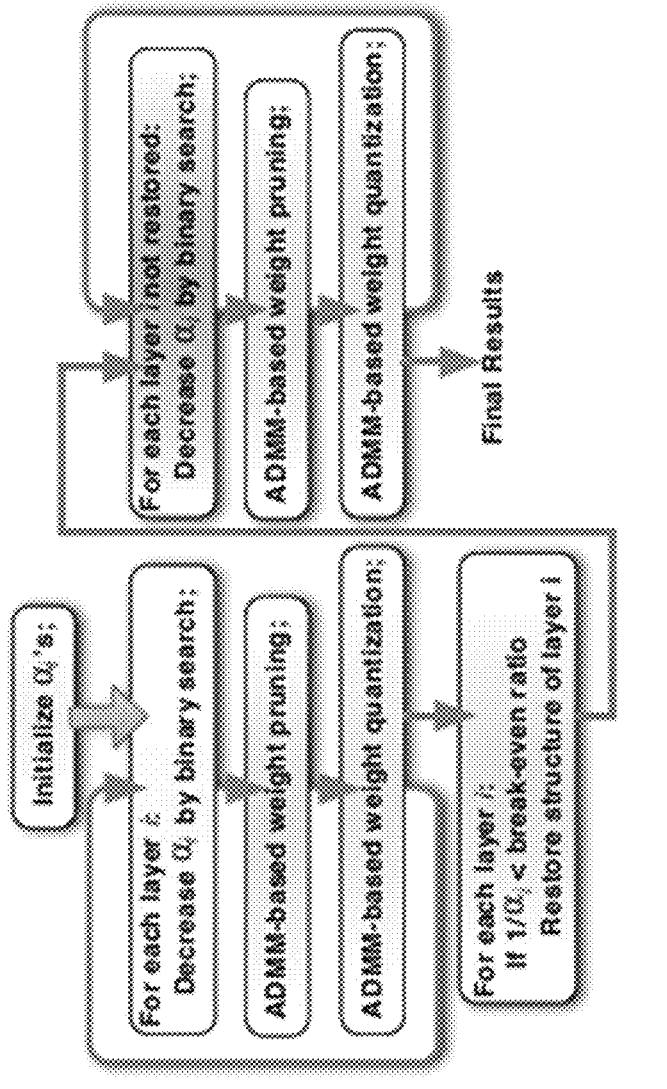
FIG. 5 is a flow chart illustrating the algorithm of hardware-aware DNN model compression in accordance with one or more embodiments.

Hardware-Aware DNN Model Compression Algorithm: Based on the efficient calculation of such break-even pruning ratios, we develop efficient hardware-aware DNN model compression algorithm. We mainly focus on the CONV layers and perform weight pruning/quantization on FC layers accordingly to maintain accuracy. The detailed algorithm description is in FIG. 5 as detailed in the following.

Consider a DNN with N' CONV layers. Let $C_i$ ($1 \leq i \leq N'$) denote the amount of computation, in the total number of operations, of the original DNN without weight pruning. Let $\alpha_i$ denote the portion of remaining weights in layer i after weight pruning, and $1/\alpha_i$ denotes the pruning ratio in layer i. We start from pretrained DNN models, and initialize $\alpha_i$ values from those in the prior work such as [22, 24], which can partially reveal the sensitivity to weight pruning for each layer. Since (i) our ADMM framework achieves higher performance and (ii) we focus mainly on CONV layers, we are able to reduce $\alpha_i$ values for different i. This is an iterative procedure. The amount of reduction $\Delta\alpha_i$ in each iteration is proportional to Ci. The underlying principle is to reduce the computation to a larger extent in those layers that are more computationally intensive (and likely, with a higher degree of redundancy). Binary search algorithm is exploited to find the updated $\alpha_i$ values that will not result in any accuracy degradation (this constraint can be relieved to a pre-defined accuracy degradation constraint). Note that the FC layers will be pruned in accordance through this procedure for accuracy considerations.

The next step is to check whether the pruning ratios $1/\alpha_i$ surpass the hardware-specific break-even pruning ratio. If not, then performing pruning on layer i will not be beneficial for hardware acceleration. In this case we will (i) restore the structure for all layers that cannot surpass the break-even ratio (e.g., the first layer in AlexNet in practice), and (ii) reduce the a values of the other layers and perform ADMM-based weight pruning. Binary search is also utilized to accelerate the search. Upon convergence those layers will still surpass the break-even pruning ratio since we only decrease a values in the procedure.

After weight pruning, we perform ADMM-based weight quantization in order to further reduce computation and improve energy efficiency. Weight quantization is performed on both CONV and FC layers, but CONV layers will be given top priority in this procedure.

6. Results and Discussions on Computation Reduction and Hardware-Aware Optimizations In this section, we first perform comparison on the computation reduction results focusing on the CONV layers (FC layers will be pruned accordingly as well to maintain accuracy). Next we compare on the synthesized hardware speedup results between the proposed hardware-aware DNN model compression algorithm with baselines. The baselines include the iterative weight pruning and weight clustering work [22, 24], and recent work [36, 53] of DNN weight pruning focusing on computation reductions. Due to space limitation, we only illustrate the comparison results on AlexNet (BVLC and CaffeNet models) on ImageNet dataset, but we achieve similar results on other benchmarks. Again algorithm implementations are on the open-source Caffe tool with code/model release, and DNN model training and model compression are performed using NVIDIA 1080Ti and P100 GPUs.

6.1 Computation Reduction Comparisons

Table 8 (FIG. 13) illustrates the comparison results on the computation reduction for the five CONV layers of AlexNet model. We show both layer-wise results and the overall results for all CONV layers. We use two metrics to quantify computation reduction. The first metric is the number of multiply-and-accumulation (MAC) operations, the key operations in the DNN inference procedure. This metric is directly related to the hardware performance (speed). The second metric is the product of the number of MAC operations and bit quantization width for each weight. This metric is directly related to the energy efficiency of (FPGA or ASIC) hardware implementation.

As can be observed in the table, the proposed ADMM framework achieves significant amount of computation reduction compared with prior work, even when some [36, 53] also focus on computation reductions. For the first metric of computation reduction, the improvement can be close to 3× compared with prior work for CONV layers, and this improvement reaches 3.6× for the second metric. The improvement on the second metric of computation reduction is even higher because of the higher capability of the proposed method in weight quantization. We can also observe that the first CONV layer is more difficult for weight pruning and quantization compared with the other layers. This will impact the hardware speedup as shall be seen in the latter discussions.

Because CONV layers are widely acknowledged to be more difficult to perform pruning than FC layers, the high performance in CONV layer pruning and quantization further demonstrates the effectiveness of the ADMM-based DNN model compression technique. Besides, although our results focus on CONV layer compression, we achieve 13× weight pruning ratio on the overall DNN model because FC layers are pruned as well. The overall weight pruning on DNN model is also higher than the prior work. The layer-wise pruning results are shown in Table 8 (FIG. 13). In this way we simultaneously achieve computation and model size reduction.

6.2 Synthesized Hardware Speedup Comparisons

Table 9 (FIG. 14) illustrates the comparison results, between the hardware-aware DNN model compression algorithm and baselines, on the synthesized hardware speedup for the five CONV layers of AlexNet model. The overall weight pruning ratio on the five CONV layers is also provided. We show both layer-wise results and the overall results for all CONV layers. The overall result is a weighted sum of the layer-wise results because of different amount of computation/parameters for each layer. The synthesized results are based on (i) the PE synthesis based on SMIC 40 nm CMOS process using Synopsys Design Compiler, and (ii) the execution on a representative CONV layer (CONV4 of AlexNet). The hardware synthesis process accounts for the hardware performance overhead of weight pruning. Although the synthesis is based on ASIC setup, the conclusion generally holds for FPGA as well. For hardware speedup synthesis, we use the same number of PEs for the proposed method and baselines, and do not account for the advantage of the proposed method in weight quantization. This metric is conservative for the proposed method, but could effectively illustrate the effect of hardware-aware DNN optimization and the break-even pruning ratio.

In terms of hardware synthesis results, our methods result in speedup compared with original DNNs without compression. On the other hand, the baselines suffer from speed degradations. Such degradations are actually observed in prior work [24, 53, 58]. As can be observed from the table, we do not perform any weight pruning on the first CONV layer. This is because the weight pruning ratio for this layer is lower than the break-even pruning ratio derived in the previous section. In this way weight pruning will not bring about any speedup benefit for this layer. The underlying reason is that weights in the first CONV layer are directly connected to the pixels of the input image, and therefore most of the weights in the first CONV layer are useful. Hence the margin of weight pruning in the first CONV layer is limited. Although the first CONV layer is small compared with the other layers in terms of the number of weights, it will become the computation bottleneck among all CONV layers. This observation is also true in other DNNs like VGGNet or ResNet. When neglecting this factor, the baseline methods will incur degradation in the speed (which is common for all baselines in the first CONV layer) compared with the original DNN models without compression. Of course, speedups will be observed in baselines if they leave CONV1 unchanged.

When we target at further weight pruning on the CONV layers with certain degree of accuracy loss, we can achieve 25.5× weight pruning on overall CONV layers (40.5× pruning on CONV2-5) with only 1.5% accuracy loss. In contrast to the significant pruning ratio, the synthesized speedup only has a marginal increase. This is because of the bottleneck of CONV1 and the saturation of speedup in the other CONV layers.

7. Technical Advantages

The ADMM techniques can achieve 85× and 24× pruning on representative LeNet-5 and AlexNet models, respectively, without accuracy loss. This is significantly higher than prior work (around 10× pruning). The improvement becomes more significant when focusing on computing reductions.

When combining weight pruning and quantization, the techniques can achieve 1,910× and 231× reductions in overall model size on these two benchmarks in connection with weight data storage.

Highly promising results are also observed on other representative DNNs such as VGGNet and ResNet-50.

Significant on-chip acceleration of DNN inference can be achieved due to significantly reduced computation, storage, and communication costs. On-chip storage of the whole DNN models is feasible.

This technology can allow tens of times acceleration of deep learning/AI applications using the same hardware. It can also allow tens of times reduction in hardware footprint, power/energy consumption for the same application/task (even more than that because the on-chip memory system can be significantly reduced or even eliminated sometimes). This results in significant commercial and financial advantages, tens of times cost/energy consumption reduction, or tens of times throughput enhancement. The technology can be implemented in mobile and sensor applications. It can also support machine intelligence.

The technology is generally applicable to any application that requires real-time, fast implementation of deep learning and AI systems. It can enable wide application of DNNs on embedded, mobile, and IoT systems. Examples of applications include autonomous driving systems, unmanned aerial vehicles (UAVs), intelligent robotic systems, real-time medical imaging applications, cloud-based AI and deep learning accelerators, and field testing, road scan, and sensor-based intelligent systems.

Figure 15:
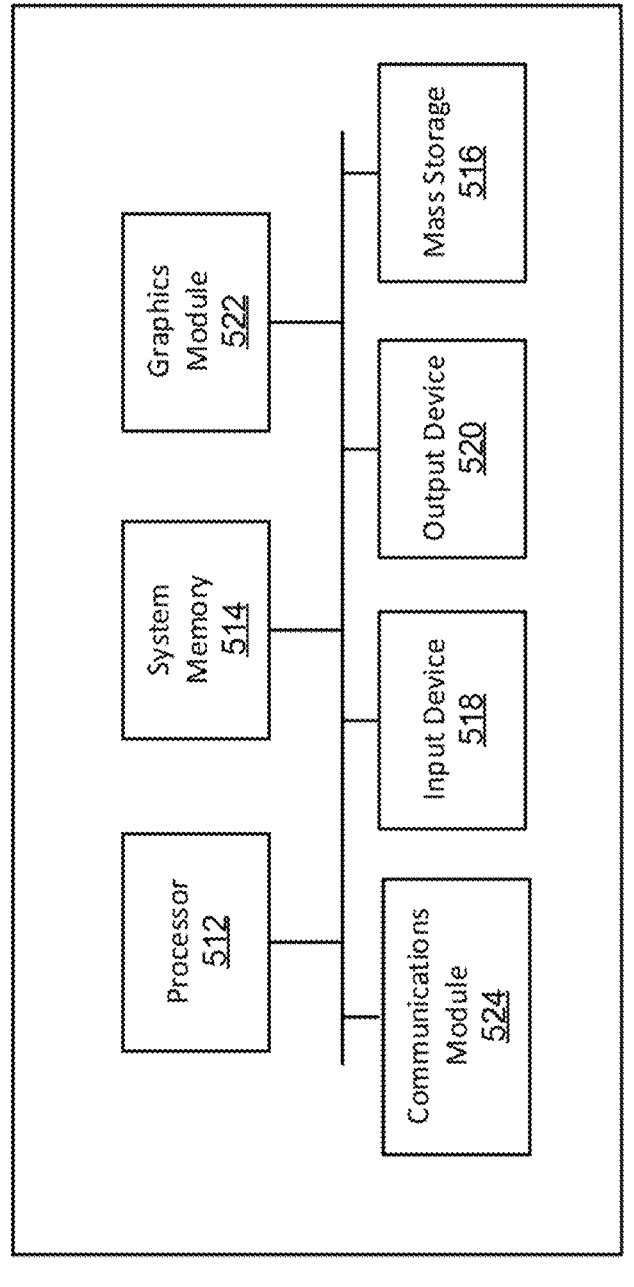
FIG. 15 is a block diagram illustrating an exemplary computer system in which the methods described herein in accordance with one or more embodiments can be implemented.

The methods, operations, modules, and systems described herein particularly for compressing DNN models using ADMM techniques may be implemented in one or more computer programs executing on a programmable computer system. FIG. 15 is a simplified block diagram illustrating an exemplary computer system 510, on which the one or more computer programs may operate as a set of computer instructions. The computer system 510 includes, among other things, at least one computer processor 512, system memory 514 (including a random access memory and a read-only memory) readable by the processor 512. The computer system 510 also includes a mass storage device 516 (e.g., a hard disk drive, a solid-state storage device, an optical disk device, etc.). The computer processor 512 is capable of processing instructions stored in the system memory or mass storage device. The computer system additionally includes input/output devices 518, 520 (e.g., a display, keyboard, pointer device, etc.), a graphics module 522 for generating graphical objects, and a communication module or network interface 524, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

REFERENCES

[1] Osborne, Joe. "Google's Tensor Processing Unit explained: this is what the future of computing looks like." Techradar, 22 Aug. 2016, www.techradar.com/news/computing-components/processors/google-s-tensor-processing-unit-explained-this-is-what-the-future-of-computing-looks-like-1326915.

[2] Matsumoto, Craig. "Intel's Deep Learning Chips Will Arrive in 2017." Sdxcentral, 18 Nov. 2016, www.sdxcentral.com/articles/news/intels-deep-learning-chips-will-arrive-2017.

[3] Aghasi, A., Abdi, A., Nguyen, N., and Romberg, J. Net-trim: Convex pruning of deep neural networks with performance guarantee. In Advances in Neural Information Processing Systems (2017), pp. 3177-3186.

[4] Bang, S., Wang, J., Li, Z., Gao, C., Kim, Y., Dong, Q., Chen, Y.-P., Fick, L., Sun, X., Dreslinski, R., et al. 14.7 a 288 μw programmable deep-learning processor with 270 kb on-chip weight storage using non-uniform memory hierarchy for mobile intelligence. In Solid-State Circuits Conference (ISSCC), 2017 IEEE International (2017), IEEE, pp. 250-251.

[5] Boyd, S., Parikh, N., Chu, E., Peleato, B., Eckstein, J., et al. Distributed optimization and statistical learning via the alternating direction method of multipliers. Foundations and Trends® in Machine learning 3, 1 (2011), 1-122.

[6] Chen, T., Du, Z., Sun, N., Wang, J., Wu, C., Chen, Y., and Temam, O. Diannao: A small-footprint high-throughput accelerator for ubiquitous machine-learning. ACM Sigplan Notices 49 (2014), 269-284.

[7] Chen, Y., Luo, T., Liu, S., Zhang, S., He, L., Wang, J., Li, L., Chen, T., Xu, Z., Sun, N., et al. Dadiannao: A machine-learning supercomputer. In Proceedings of the 47th Annual IEEE/ACM International Symposium on Microarchitecture (2014), IEEE Computer Society, pp. 609-622.

[8] Chen, Y.-H., Krishna, T., Emer, J. S., and Sze, V. Eyeriss: An energy-efficient reconfigurable accelerator for deep convolutional neural networks. IEEE Journal of Solid-State Circuits 52, 1 (2017), 127-138.

[9] Courbariaux, M., Bengio, Y., and David, J.-P. Binary-connect: Training deep neural networks with binary weights during propagations. In Advances in neural information processing systems (2015), pp. 3123-3131.

[10] Dai, X., Yin, H., and Jha, N. K. Nest: a neural network synthesis tool based on a grow-and-prune paradigm. arXiv preprint arXiv:1711.02017 (2017).

[11] Deng, J., Dong, W., Socher, R., Li, L.-J., Li, K., and Fei-Fei, L. Imagenet: A large-scale hierarchical image database. In Proceedings of the IEEE Conference on Computer Vision and Pattern Recognition (2009), pp. 248-255.

[12] Denton, E. L., Zaremba, W., Bruna, J., LeCun, Y., and Fergus, R. Exploiting linear structure within convolutional networks for efficient evaluation. In Advances in neural information processing systems (2014), pp. 1269-1277.

[13] Desoli, G., Chawla, N., Boesch, T., Singh, S.-p., Guidetti, E., De Ambroggi, F., Majo, T., Zambotti, P., Ayodhyawasi, M., Singh, H., et al. 14.1 a 2.9 tops/w deep convolutional neural network soc in fd-soi 28 nm for intelligent embedded systems. In Solid-State Circuits Conference (ISSCC), 2017 IEEE International (2017), IEEE, pp. 238-239.

[14] Ding, C., Liao, S., Wang, Y., Li, Z., Liu, N., Zhuo, Y., Wang, C., Qian, X., Bai, Y., Yuan, G., et al. C it cnn: accelerating and compressing deep neural networks using block-circulant weight matrices. In Proceedings of the 50th Annual IEEE/ACM International Symposium on Microarchitecture (2017), ACM, pp. 395-408.

[15] Dong, X., Chen, S., and Pan, S. Learning to prune deep neural networks via layer-wise optimal brain surgeon. In Advances in Neural Information Processing Systems (2017), pp. 4857-4867.

[16] Du, Z., Fasthuber, R., Chen, T., Ienne, P., Li, L., Luo, T., Feng, X., Chen, Y., and Temam, O. Shidiannao: Shifting vision processing closer to the sensor. In Computer Architecture (ISCA), 2015 ACM/IEEE 42nd Annual International Symposium on (2015), IEEE, pp. 92-104.

[17] Goodfellow, I., Bengio, Y., Courville, A., and Bengio, Y. Deep learning, vol. 1. MIT press Cambridge, 2016.

[18] Guo, K., Han, S., Yao, S., Wang, Y., Xie, Y., and Yang, H. Software-hardware codesign for efficient neural network acceleration. In Proceedings of the 50th Annual IEEE/ACM International Symposium on Microarchitecture (2017), IEEE Computer Society, pp. 18-25.

[19] Guo, Y., Yao, A., and Chen, Y. Dynamic network surgery for efficient dnns. In Advances In Neural Information Processing Systems (2016), pp. 1379-1387.

[20] Han, S., Kang, J., Mao, H., Hu, Y., Li, X., Li, Y., Xie, D., Luo, H., Yao, S., Wang, Y., et al. Ese: Efficient speech recognition engine with sparse lstm on fpga. In Proceedings of the 2017 ACM/SIGDA International Symposium on Field-Programmable Gate Arrays (2017), ACM, pp. 75-84.

[21] Han, S., Liu, X., Mao, H., Pu, J., Pedram, A., Horowitz, M. A., and Dally, W. J. Eie: efficient inference engine on compressed deep neural network. In Computer Architecture (ISCA), 2016 ACM/IEEE 43rd Annual International Symposium on (2016), IEEE, pp. 243-254.

[22] Han, S., Mao, H., and Dally, W. J. Deep compression: Compressing deep neural networks with pruning, trained quantization and huffman coding. In International Conference on Learning Representations (ICLR) (2016).

[23] Han, S., Pool, J., Narang, S., Mao, H., Gong, E., Tang, S., Elsen, E., Vajda, P., Paluri, M., Tran, J., et al. Dsd: Dense-sparse-dense training for deep neural networks. In International Conference on Learning Representations (ICLR) (2017).

[24] Han, S., Pool, J., Tran, J., and Dally, W. Learning both weights and connections for efficient neural network. In Advances in neural information processing systems (2015), pp. 1135-1143.

[25] He, K., Zhang, X., Ren, S., and Sun, J. Deep residual learning for image recognition. In Proceedings of the IEEE conference on computer vision and pattern recognition (2016), pp. 770-778.

[26] He, Y., Zhang, X., and Sun, J. Channel pruning for accelerating very deep neural networks. In Computer Vision (ICCV), 2017 IEEE International Conference on (2017), IEEE, pp. 1398-1406.

[27] Hubara, I., Courbariaux, M., Soudry, D., El-Yaniv, R., and Bengio, Y. Binarized neural networks. In Advances in neural information processing systems (2016), pp. 4107-4115.

[28] Judd, P., Albericio, J., Hetherington, T., Aamodt, T. M., and Moshovos, A. Stripes: Bit-serial deep neural network computing. In Proceedings of the 49th Annual IEEE/ACM International Symposium on Microarchitecture (2016), IEEE Computer Society, pp. 1-12.

[29] Kingma, D., and Ba, L. Adam: A method for stochastic optimization. In International Conference on Learning Representations (ICLR) (2016).

[30] Krizhevsky, A., Sutskever, I., and Hinton, G. E. Imagenet classification with deep convolutional neural networks. In Advances in neural information processing systems (2012), pp. 1097-1105.

[31] Kwon, H., Samajdar, A., and Krishna, T. Maeri: Enabling flexible dataflow mapping over dnn accelerators via reconfigurable interconnects. In Proceedings of the Twenty-Third International Conference on Architectural Support for Programming Languages and Operating Systems (2018), ACM, pp. 461-475.

[32] LeCun, Y., et al. "Lenet-5, convolutional neural networks." lecun, 2015, yann.lecun.com/exdb/lenet/a35.html.

[33] Leng, C., Li, H., Zhu, S., and Jin, R. Extremely low bit neural network: Squeeze the last bit out with admm. arXiv preprint arXiv:1707.09870 (2017).

[34] Lin, D., Talathi, S., and Annapureddy, S. Fixed point quantization of deep convolutional networks. In International Conference on Machine Learning (2016), pp. 2849-2858.

[35] Mahajan, D., Park, J., Amaro, E., Sharma, H., Yazdanbakhsh, A., Kim, J. K., and Esmaeilzadeh, H. Tabla: A unified template-based framework for accelerating statistical machine learning. In High Performance Computer Architecture (HPCA), 2016 IEEE International Symposium on (2016), IEEE, pp. 14-26.

[36] Mao, H., Han, S., Pool, J., Li, W., Liu, X., Wang, Y., and Dally, W. J. Exploring the regularity of sparse structure in convolutional neural networks. arXiv preprint arXiv:1705.08922 (2017).

[37] Moons, B., Uytterhoeven, R., Dehaene, W., and Verhelst, M. 14.5 envision: A 0.26-to-10 tops/w subword-parallel dynamic-voltage-accuracy-frequency-scalable convolutional neural network processor in 28 nm fdsoi. In Solid-State Circuits Conference (ISSCC), 2017 IEEE International (2017), IEEE, pp. 246-247.

[38] Ouyang, H., He, N., Tran, L., and Gray, A. Stochastic alternating direction method of multipliers. In International Conference on Machine Learning (2013), pp. 80-88.

[39] Parashar, A., Rhu, M., Mukkara, A., Puglielli, A., Venkatesan, R., Khailany, B., Emer, J., Keckler, S. W., and Dally, W. J. Scnn: An accelerator for compressed-sparse convolutional neural networks. In ACM SIGARCH Computer Architecture News (2017), vol. 45, ACM, pp. 27-40.

[40] Park, E., Ahn, J., and Yoo, S. Weighted-entropy-based quantization for deep neural networks. In Proceedings of the IEEE Conference on Computer Vision and Pattern Recognition (2017), pp. 7197-7205.

[41] Qiu, J., Wang, J., Yao, S., Guo, K., Li, B., Zhou, E., Yu, J., Tang, T., Xu, N., Song, S., et al. Going deeper with embedded fpga platform for convolutional neural network. In Proceedings of the 2016 ACM/SIGDA International Symposium on Field-Programmable Gate Arrays (2016), ACM, pp. 26-35.

[42] Rastegari, M., Ordonez, V., Redmon, J., and Farhadi, A. Xnor-net: Imagenet classification using binary convolutional neural networks. In European Conference on Computer Vision (2016), Springer, pp. 525-542.

[43] Reagen, B., Whatmough, P., Adolf, R., Rama, S., Lee, H., Lee, S. K., Hernandez-Lobato, J. M., Wei, G.-Y., and Brooks, D. Minerva: Enabling low-power, highly-accurate deep neural network accelerators. In Computer Architecture (ISCA), 2016 ACM/IEEE 43rd Annual International Symposium on (2016), IEEE, pp. 267-278.

[44] Sharma, H., Park, J., Mahajan, D., Amaro, E., Kim, J. K., Shao, C., Mishra, A., and Esmaeilzadeh, H. From high-level deep neural models to fpgas. In Proceedings of the 49th Annual IEEE/ACM International Symposium on Microarchitecture (2016), IEEE Computer Society, pp. 1-13.

[45] Sim, J., Park, J.-S., Kim, M., Bae, D., Choi, Y., and Kim, L.-S. 14.6 a 1.42 tops/w deep convolutional neural network recognition processor for intelligent ioe systems. In Solid-State Circuits Conference (ISSCC), 2016 IEEE International (2016), IEEE, pp. 264-265.

[46] Simonyan, K., and Zisserman, A. Very deep convolutional networks for large-scale image recognition. arXiv preprint arXiv:1409.1556 (2014).

[47] Simonyan, K., and Zisserman, A. Very deep convolutional networks for large-scale image recognition. In International Conference on Learning Representations (ICLR) (2015).

[48] Song, M., Zhong, K., Zhang, J., Hu, Y., Liu, D., Zhang, W., Wang, J., and Li, T. In-situ ai: Towards autonomous and incremental deep learning for iot systems. In High Performance Computer Architecture (HPCA), 2018 IEEE International Symposium on (2018), IEEE, pp. 92-103.

[49] Suda, N., Chandra, V., Dasika, G., Mohanty, A., Ma, Y., Vrudhula, S., Seo, J.-s., and Cao, Y. Throughput-optimized opencl-based fpga accelerator for large-scale convolutional neural networks. In Proceedings of the 2016 ACM/SIGDA International Symposium on Field-Programmable Gate Arrays (2016), ACM, pp. 16-25.

[50] Suzuki, T. Dual averaging and proximal gradient descent for online alternating direction multiplier method. In International Conference on Machine Learning (2013), pp. 392-400.

[51] Umuroglu, Y., Fraser, N. J., Gambardella, G., Blott, M., Leong, P., Jahre, M., and Vissers, K. Finn: A framework for fast, scalable binarized neural network inference. In Proceedings of the 2017 ACM/SIGDA International Symposium on Field-Programmable Gate Arrays (2017), ACM, pp. 65-74.

[52] Venkataramani, S., Ranjan, A., Banerjee, S., Das, D., Avancha, S., Jagan-nathan, A., Durg, A., Nagaraj, D., Kaul, B., Dubey, P., et al. Scaledeep: A scalable compute architecture for learning and evaluating deep networks. In Computer Architecture (ISCA), 2017 ACM/IEEE 44th Annual International Symposium on (2017), IEEE, pp. 13-26.

[53] Wen, W., Wu, C., Wang, Y., Chen, Y., and Li, H. Learning structured sparsity in deep neural networks. In Advances in Neural Information Processing Systems (2016), pp. 2074-2082.

[54] Whatmough, P. N., Lee, S. K., Lee, H., Rama, S., Brooks, D., and Wei, G.-Y. 14.3 a 28 nm soc with a 1.2 ghz 568nj/prediction sparse deep-neural-network engine with >0.1 timing error rate tolerance for iot applications. In Solid-State Circuits Conference (ISSCC), 2017 IEEE International (2017), IEEE, pp. 242-243.

[55] Wu, J., Leng, C., Wang, Y., Hu, Q., and Cheng, J. Quantized convolutional neural networks for mobile devices. In Proceedings of the IEEE Conference on Computer Vision and Pattern Recognition (2016), pp. 4820-4828.

[56] Yang, T.-J., Chen, Y.-H., and Sze, V. Designing energy-efficient convolutional neural networks using energy-aware pruning. In Proceedings of the IEEE Conference on Computer Vision and Pattern Recognition (2017), pp. 6071-6079.

[57] Ye, S., Zhang, T., Zhang, K., Li, J., Xie, J., Liang, Y., Liu, S., Lin, X., and Wang, Y. A unified framework of dnn weight pruning and weight clustering/quantization using admm. arXiv preprint arXiv:1811.01907 (2018).

[58] Yu, J., Lukefahr, A., Palframan, D., Dasika, G., Das, R., and Mahlke, S. Scalpel: Customizing dnn pruning to the underlying hardware parallelism. In Computer Architecture (ISCA), 2017 ACM/IEEE 44th Annual International Symposium on (2017), IEEE, pp. 548-560.

[59] Yu, X., Liu, T., Wang, X., and Tao, D. On compressing deep models by low rank and sparse decomposition. In Proceedings of the IEEE Conference on Computer Vision and Pattern Recognition (2017), pp. 7370-7379.

[60] Yuan, Z., Yue, J., Yang, H., Wang, Z., Li, J., Yang, Y., Guo, Q., Li, X., Chang, M.-F., Yang, H., et al. Sticker: A 0.41-62.1 tops/w 8 bit neural network processor with multi-sparsity compatible convolution arrays and online tuning acceleration for fully connected layers. In 2018 IEEE Symposium on VLSI Circuits (2018), IEEE, pp. 33-34.

[61] Zhang, C., Fang, Z., Zhou, P., Pan, P., and Cong, J. Caffeine: towards uniformed representation and acceleration for deep convolutional neural networks. In Proceedings of the 35th International Conference on Computer-Aided Design (2016), ACM, p. 12.

[62] Zhang, C., Wu, D., Sun, J., Sun, G., Luo, G., and Cong, J. Energy-efficient cnn implementation on a deeply pipelined fpga cluster. In Proceedings of the 2016 International Symposium on Low Power Electronics and Design (2016), ACM, pp. 326-331.

[63] Zhang, D., Wang, H., Figueiredo, M., and Balzano, L. Learning to share: Simultaneous parameter tying and sparsification in deep learning.

[64] Zhang, T., Ye, S., Zhang, K., Tang, J., Wen, W., Fardad, M., and Wang, Y. A systematic dnn weight pruning framework using alternating direction method of multipliers. arXiv preprint arXiv:1804.03294 (2018).

[65] Zhao, R., Song, W., Zhang, W., Xing, T., Lin, J.-H., Srivastava, M., Gupta, R., and Zhang, Z. Accelerating binarized convolutional neural networks with software-programmable fpgas. In Proceedings of the 2017 ACM/SIGDA International Symposium on Field-Programmable Gate Arrays (2017), ACM, pp. 15-24.

[66] Zhou, A., Yao, A., Guo, Y., Xu, L., and Chen, Y. Incremental network quantization: Towards lossless cnns with low-precision weights. In International Conference on Learning Representations (ICLR) (2017).

[67] Zhu, C., Han, S., Mao, H., and Dally, W. J. Trained ternary quantization. In International Conference on Learning Representations (ICLR) (2017).

The invention claimed is:

1. A computer-implemented method for compressing a deep neural network (DNN) model using an Alternating Direction Method of Multipliers (ADMM) technique, comprising the steps of:

(a) performing ADMM weight pruning on weights in the DNN model by solving a first subproblem and a second subproblem iteratively until convergence to reduce a number of weights in the DNN model to a set of non-zero weights, wherein performing the ADMM weight pruning is based on a break-even pruning ratio, wherein the break-even pruning ratio is hardware platform specific, and calculating the break-even pruning ratio comprises, synthesizing a baseline hardware implementation and at least a second hardware implementation, each having a same hardware area;

determining a first inference delay of the baseline hardware implementation of an original DNN layer without pruning and at least a second inference delay of at least the second hardware implementation under at least a second pruning ratio; and determining, based on the first inference delay and at least the second inference delay, the break-even pruning ratio;

(b) performing ADMM weight quantization on the set of non-zero weights by solving the first subproblem and the second subproblem iteratively until convergence to generate a weight pruned and quantized DNN model;

wherein the first subproblem comprises performing DNN training with an additional L2 regularization term, and the second subproblem comprises dynamically updating a regularization target in each iteration; and (c) allocating on-chip or off-chip memory to each portion of the weight pruned and quantized DNN model based on a computational intensity of that portion.

2. The method of claim 1, wherein the first subproblem comprises minimizing a loss function of the DNN model with the additional L2 regularization term.

3. The method of claim 1, wherein the first subproblem is solved using a stochastic gradient descent algorithm.

4. The method of claim 1, wherein the second subproblem is solved analytically and using optimization.

5. The method of claim 1, wherein the DNN model is pretrained.

6. The method of claim 1, further comprising performing a hardware-aware optimization of the weight pruned and quantized DNN model to facilitate an efficient hardware platform specific implementation.

7. The method of claim 6, wherein performing the hardware-aware optimization comprises performing further weight pruning and quantization of the DNN model to account for computation reduction and energy efficiency improvement and hardware performance overhead due to irregular sparsity.

8. A computer system, comprising:

at least one processor;

memory associated with the at least one processor; and a program supported in the memory for compressing a deep neural network (DNN) model using an Alternating Direction Method of Multipliers (ADMM) technique, the program containing a plurality of instructions which, when executed by the at least one processor, cause the at least one processor to:

(a) perform ADMM weight pruning on weights in the DNN model by solving a first subproblem and a second subproblem iteratively until convergence to reduce a number of weights in the DNN model to a set of non-zero weights, wherein performing the ADMM weight pruning is based on a break-even pruning ratio, wherein the break-even pruning ratio is hardware platform specific, and calculating the break-even pruning ratio comprises, synthesizing a baseline hardware implementation and at least a second hardware implementation, each having a same hardware area;

determining a first inference delay of the baseline hardware implementation of an original DNN layer without pruning and at least a second inference delay of at least the second hardware implementation under at least a second pruning ratio; and determining, based on the first inference delay and at least the second inference delay, the break-even pruning ratio;

(b) perform ADMM weight quantization on the set of non-zero weights by solving the first subproblem and the second subproblem iteratively until convergence to generate a weight pruned and quantized DNN model;

wherein the first subproblem comprises performing DNN training with an additional L2 regularization term, and the second subproblem comprises dynamically updating a regularization target in each iteration; and (c) allocating on-chip or off-chip memory, in the memory associated with the at least one processor, to each portion of the weight pruned and quantized DNN model based on a computational intensity of that portion.

9. The computer system of claim 8, wherein the first subproblem comprises minimizing a loss function of the DNN model with the additional L2 regularization term.

10. The computer system of claim 8, wherein the first subproblem is solved using a stochastic gradient descent algorithm.

11. The computer system of claim 8, wherein the second subproblem is solved analytically and using optimization.

12. The computer system of claim 8, wherein the DNN model is pretrained.

13. The computer system of claim 8, further comprising performing a hardware-aware optimization of the weight pruned and quantized DNN model to facilitate an efficient hardware platform specific implementation.

14. The computer system of claim 13, wherein performing the hardware-aware optimization comprises performing further weight pruning and quantization of the DNN model to account for computation reduction and energy efficiency improvement and hardware performance overhead due to irregular sparsity.

15. A computer program product for compressing a deep neural network (DNN) model using an Alternating Direction Method of Multipliers (ADMM) technique, the computer program product residing on a non-transitory computer readable medium having a plurality of instructions stored thereon which, when executed by a computer processor, cause that computer processor to:

(a) perform ADMM weight pruning on weights in the DNN model by solving a first subproblem and a second subproblem iteratively until convergence to reduce a number of weights in the DNN model to a set of non-zero weights, wherein performing the ADMM weight pruning is based on a break-even pruning ratio, wherein the break-even pruning ratio is hardware platform specific, and calculating the break-even pruning ratio comprises, synthesizing a baseline hardware implementation and at least a second hardware implementation, each having a same hardware area;

determining a first inference delay of the baseline hardware implementation of an original DNN layer without pruning and at least a second inference delay of at least the second hardware implementation under at least a second pruning ratio; and determining, based on the first inference delay and at least the second inference delay, the break-even pruning ratio;

(b) perform ADMM weight quantization on the set of non-zero weights by solving the first subproblem and the second subproblem iteratively until convergence to generate a weight pruned and quantized DNN model;

wherein the first subproblem comprises performing DNN training with an additional L2 regularization term, and the second subproblem comprises dynamically updating a regularization target in each iteration; and (c) allocating on-chip or off-chip memory to each portion of the weight pruned and quantized DNN model based on a computational intensity of that portion.

16. The computer program product of claim 15, wherein the first subproblem comprises minimizing a loss function of the DNN model with the additional L2 regularization term.

17. The computer program product of claim 15, wherein the first subproblem is solved using a stochastic gradient descent algorithm.

18. The computer program product of claim 15, wherein the second subproblem is solved analytically and using optimization.

19. The computer program product of claim 15, further comprising instructions for performing a hardware-aware optimization of the weight pruned and quantized DNN model to facilitate an efficient hardware platform specific implementation.

20. The computer program product of claim 19, wherein performing the hardware-aware optimization comprises performing further weight pruning and quantization of the DNN model to account for computation reduction and energy efficiency improvement and hardware performance overhead due to irregular sparsity.

* * * * *